US005524177A

United States Patent [19]

Suzuoka

[11] Patent Number: 5,524,177
[45] Date of Patent: Jun. 4, 1996

[54] LEARNING OF ASSOCIATIVE MEMORY IN FORM OF NEURAL NETWORK SUITABLE FOR CONNECTIONIST MODEL

[75] Inventor: Takashi Suzuoka, Chiba-ken, Japan

[73] Assignee: Kabushiki Kaisha Toshiba, Kawasaki, Japan

[21] Appl. No.: 85,050

[22] Filed: Jul. 2, 1993

[30] Foreign Application Priority Data

Jul. 3, 1992 [JP] Japan .................................. 4-176536

[51] Int. Cl.$^6$ ................................................. G06F 15/18
[52] U.S. Cl. ................................................. 395/23; 395/22
[58] Field of Search ............................... 395/22, 23, 24, 395/21

[56] References Cited

U.S. PATENT DOCUMENTS

| | | | |
|---|---|---|---|
| 4,660,166 | 4/1987 | Hopfield | 364/807 |
| 4,874,963 | 10/1989 | Alspector | 395/24 |
| 5,050,095 | 9/1991 | Samad | 395/23 |
| 5,086,479 | 2/1992 | Takenaga et al. | 395/22 |
| 5,150,450 | 9/1992 | Swenson et al. | 395/23 |
| 5,253,328 | 10/1993 | Hartman | 395/23 |
| 5,257,343 | 10/1993 | Kyuma et al. | 395/22 |

FOREIGN PATENT DOCUMENTS

| | | |
|---|---|---|
| 3-22167 | 1/1991 | Japan . |
| 3-179560 | 8/1991 | Japan . |

OTHER PUBLICATIONS

Collins, "A Neural Network Based on Co-Occurrence Probabilities", IEEE 1st Int'l Conf on Neural Networks, pp. 487–494, Jun. 21–24 1987.

Kosko, "Bidirectional Associative Memories", IEEE Transactions on Systems, Man & Cybernetics, vol. 18 No. 1 pp. 49–60, Jan. 1988.

Yin et al, "An Associative Memory Model of Language" Int'l Joint Conf. on Nueral Networks, Jun. 17–21 1990, vol. 3 pp. 663–670.

D. E. Rumelhart et al., "Learning Internal Representations by Error Propagation", *Parallel Distributed Processing*, vol. 1, Chapt. 8, (1986), pp. 318–362.

J. P. Cater, "Successfully Using Peak Learning Rates of 10 (and greater) in Back–propagation Networks with the Heuristic Learning Algorithm", *IEEE First Int'l. Conf. on Neural Networks* (Jun. 1987), pp. II–645 to II–651.

R. A. Jacobs, "Increased Rates of Convergeence Through Learning Rate Adaptation", *Neural Networks* (1988), pp. 295–307.

J. L. McClelland and D. E. Rumelhart, *Explorations in Parallel Distributed Processing*, MIT Press (1988), pp. 137–141.

R. Pedone and D. Parisi, "Learning the learning parameters", *IEEE Int'l. Joint Conf. on Neural Networks* (Nov. 1991), pp. 2033–2037.

Proceedings of the National Academy of Sciences 79:2554–2558, 1982, J. J. Hopfield, "Neural Networks And Physical Systems With Emergent Collective Computational Abilities".

(List continued on next page.)

*Primary Examiner*—Robert W. Downs
*Attorney, Agent, or Firm*—Oblon, Spivak, McClelland, Maier & Neustadt

[57] ABSTRACT

The learning of an associative memory suitable for the connectionist model which can deal with the patterns having the non-random frequencies of the appearances or the non-random correlations. In this invention, the learning of the associative memory in a form of a neural network, in which a plurality of nodes having activation values are connected by a plurality of links having link weight values, is achieved by entering a plurality of learning patterns sequentially, where each learning pattern has a plurality of elements in correspondence with the nodes, calculating an energy E of the entered learning pattern, determining a learning amount δ for the entered learning pattern according to a difference between the calculated energy E and a predetermined reference energy level Eth, and updating the link weight values of the links according to the entered learning pattern and the determined learning amount δ.

18 Claims, 15 Drawing Sheets

OTHER PUBLICATIONS

Cognitive Science, vol. 9, 1985, pp. 51–74, D. L. Waltz, et al., "Massively Parallel Parsing: A Strongly Interactive Model Of Natural Language Interpretation".

Biological Cybernetics, 26, Springer–Verlag 1977, pp. 175–185, S.–I. Amari, "Neural Theory Of Association And Concept–Formation".

Neural Networks, vol. 2, 1989, pp. 451–457, Shun–ichi Amarai, "Characteristics Of Sparcely Encoded Associative Memory".

Europhysics Letters, 10 (7), Dec. 1989, pp. 627–631, C. J. Perez–Vincente, "Finite–Size Capacity Of Sparse–Coding Models".

LEARNING OF ASSOCIATIVE MEMORY IN FORM OF NEURAL NETWORK SUITABLE FOR CONNECTIONIST MODEL

BACKGROUND OF THE INVENTION

1. Field of the Invention

The present invention relates to an associative memory in a form of a neural network utilized in the cognition and comprehension scheme.

2. Description of the Background Art

The cognition and comprehension scheme based on the so called connectionist model can be utilized for a translation word selection in a natural language translation, as well as for a homonym selection in a Japanese word processing.

In this connectionist model, it is necessary to carry out a learning of the associative memory using non-random patterns. However, conventional associative memories are suited only for the learning using random patterns, where the random pattern is a pattern given as a sequence of N elements each of which taking a value of either 0 and 1, in which the values of the i-th element and the j-th (j≠i) element are determined independently. Consequently, such a conventional associative memory has been inapplicable to the cognition and comprehension scheme based on the connectionist model.

This problem of the conventional cognition and comprehension scheme based on the connectionist model will now be described in detail, using a case of the kana-kanji conversion (conversion from Japanese syllabaries to Chinese characters) in the Japanese word processing as an illustrative example.

<<The kana-kanji conversion based on the connectionist model>>

In recent years, numerous researches of the cognition and comprehension scheme based on the connectionist model have been undertaken. (See, for example, D. L. Waltz and J. B. Pollack, "Massively Parallel Parsing: A Strongly Interactive Model of Natural Language Interpretation", Cognitive science, Vol. 9, pp. 51–74, 1985.)

In this cognition and comprehension scheme, each symbol is represented by a node, and relationships among symbols are represented by a network connecting nodes together, in which a topic of the input information is recognized and semantically comprehended by propagating activation values assigned to the nodes through the network. This cognition and comprehension scheme is also applicable to the speech or letter recognition in addition to the natural language processing.

In particular, there are many researches for an application of this cognition and comprehension scheme to the kana-kanji conversion in the Japanese word processor, as can be seen for example in Japanese Patent Application Laid Open (Kokai) No. 3-22167 (1991). In this reference, the learning of the network is carried out by using a large number of actual documents, and the activation values of the nodes are propagated in response to the input information entered by the user as a key, such that the topic of the input document can be comprehended. Then, using the comprehended topic of the input document, the accuracy of the kana-kanji conversion is improved as follows.

Namely, in a case of carrying out the kana-kanji conversion in the Japanese word processor, a series of kanas (Japanese syllabaries) representing a reading of desired words is entered, and an appropriate letter series using both kanas and kanjis (Chinese characters) with appropriate portions of the entered kana series converted into kanjis is returned in response. In this process, it is necessary to select an appropriate kanji among a number of candidate kanjis which have the reading represented by the entered kana series.

In order to enable this selection, there is provided a network indicating proximities of words defined in terms of their usages, in which a link with a large positive link weight value is formed between two nodes corresponding to two words which are frequently used together. Then, when a particular word related to a current topic is selected, an activation value of the node corresponding to the selected word is raised such that the raised activation value is propagated from this node to the other nodes linked with this node, and the activation values of the nodes corresponding to the words related to the current topic are also raised as a result. Here, the propagation of the activation value is carried out through the links, where a link with a larger link weight value can propagate a larger part of the activation value.

Thus, as the input sentences are entered into the Japanese word processor, the activation values are propagated in the network to raise the activation values of the nodes corresponding to those words which are strongly related to a current topic of the input sentences. Then, at a time of the kana-kanji conversion, a homonym having the highest activation value among the homonyms is regarded as the most appropriate for the current topic, and selected as the primary candidate for the kana-kanji conversion.

For example, in a case of the kana-kanji conversion of the input sentenses as shown in FIG. 1, the selections of the words A1 ("clock"), A2 ("signal"), and A3 ("processor"), all of which belonging to the computer hardware vocabulary A0, had been already made, so that the activation values of the nodes corresponding to the computer hardware vocabularies have been raised. In this state, for the kana-kanji conversion of a reading B0, there are three candidate homonyms C1 ("synchronization"), C2 ("palpitation"), and C3 ("motivation") which share this same reading B0. Here, however, the candidate homonym C1 ("synchronization") has the highest activation value as it belongs to the computer hardware vocabularies A0, so that the kana sequence of the reading B0 will be converted into the kanjis of the homonym candidate C1.

This network has a function of associating a topic with the input information, so that it can be considered as equivalent to the associative memory in a form of a neural network.

<<Patterns used in the associative memory>>

In the cognition and comprehension scheme based on the connectionist model such as the kana-kanji conversion described above, the learning and the association operations of the associative memory are carried out by using the patterns defined as follows. (See Japanese Parent Application Laid Open (Kokai) No. 3-179560 (1991) for further detail.)

Namely, the words are assigned with the word codes given in terms of consecutive integers from 1 to N, in one to one correspondence, and each pattern is given as a bit pattern in a form of a sequence of N elements each of which taking a value of either 0 and 1. Here, the bit pattern can be determined by the following procedure.

(1) Divide sentences in units of paragraphs.

(2) Decompose each paragraph into words, and convert each word into its word code.

(3) For each paragraph, a bit of the bit sequence corresponding to the word code of the word contained in this paragraph is set to 1, while a bit of the bit sequence corresponding to the word code of the word not contained in this paragraph is set to 0.

For example, for a very brief paragraph of "The whether is fine today.", let the correspondences between the words and the word codes be as follows.

"The"=1034

"whether"=22378

"is"=123

"fine"=2876

"today"=10120

Then, this paragraph can be represented by the following set of the word codes.

{123, 1034, 2876, 10120, 22378}

Thus, when the total number of words N is equal to 100,000, the bit pattern for this paragraph has 100,000 bits of which 123-th, 1034-th, 2876-th, 10120-th, and 22378-th bits are set to 1, while all the other bits are set to 0.

Here, the bit pattern ignores any redundant appearance of the words, so that even when the same word appears more than once in the same paragraph, the bit pattern is unaffected.

Now, it is quite inevitable for the patterns so determined to have some noise or non-randomness. For example, in the sentence "I bought a book yesterday.", there is no direct semantic relationship between the words "book" and "yesterday", yet the bit pattern for this sentence will have the bits corresponding to these words "book" and "yesterday" set to 1 as they both appear in the same sentence, so as to introduce the noise or non-randomness into the patterns.

Consequently, as already mentioned above, the conventional associative memories which are suited only for the learning using random patterns are inapplicable to the network used in the kana-kanji conversion.

<<Characteristics of the patterns in the connectionist model>>

Now, in the connectionist model, the above described patterns, to be used in the learning of the network dealing with the natural language using the actual documents, must have the following characteristics.

P1: There is no noiseless, exactly correct memorized pattern (in which 1/0 bit is allocated to a node representing a symbol in the network).

There are many patterns (actual documents) that can be used as the learning patterns, but almost all of these contain some noise (words unrelated to the topic). For this reason, it is necessary to learn generalized patterns in which the effect of the noise is removed, by using a very large number of the patterns. In other words, it is not absolutely necessary to memorize the exact patterns.

P2: Each pattern contains only a very small fraction of all the available words.

There are about several hundred thousand words used in Japanese, and any individual may use about several thousand words among them, but one paragraph usually contain about several hundred words. Such a pattern containing only a small fraction of all the available words is called a sparsely encoded pattern.

P3: There are large differences among the frequencies of appearances for different words.

For example, a demonstrative pronoun "this" appears very frequently, regardless of the topic of the sentence, but a specialized word "postscript" appears only very rarely in the specialized context alone. The frequency of appearance of any word can be heavily dependent on the topic of the input sentences, but there are those words having very high frequencies of appearances as well as those words having low frequencies of appearance, regardless of the topic of the sentences.

P4: It must be possible to carry out additional earnings.

In the connectionist model, a large number of learning patterns (actual documents) are going to be given one after another. In order to cope with this situation, it must be possible to carry out the additional learnings. Namely, the learning of the additional patterns must be made easily.

P5: There is a non-randomness in the frequencies of appearances for patterns.

It is impossible to collect the patterns uniformly for all the possible topics, without specifying any particular topic. For example, when the patterns are collected from a newspaper, it is likely that one hundred patterns related to the politics are collected while only ten patterns related to the science and technology are collected. In such case of having a non-randomness in the frequencies of appearances, there is actually no way of telling which topic appeared how frequently.

P6: There is a non-randomness in the correlations among the patterns.

In general, the topics are not totally independent, and which topics are strongly related with each other depend on the situations of the sentences. In particular, it is necessary to note that there is a non-randomness in the correlations depending on the topics. For example, the politics and the science and technology may not be so strongly correlated, but the politics and the economy can be quite strongly correlated.

<<Conventionally available associative memory>>

The associative memory suitable for the connectionist model should be capable of grasping the topic from a group of the words that are frequently appearing together in a large number of sentences, such that the group of the words related to a topic of an input sentence can be presented.

Now, for the associative memory in a form of neural network, there are two manners of learning including an orthogonal learning and a correlational learning. However, the orthogonal learning requires the learning patterns without any noise, and it is also not suitable for the additional learning. As already mentioned above, the associative memory for the connectionist model should be able to deal with noise, and learn the generic pattern from a number of learning patterns containing noise by generalization, so that the correlational learning is more appropriate for this purpose.

In the correlational learning of the associative memory, a matrix to be used for representing the network can be chosen from a correlation matrix and a covariance matrix. However, it is known that the associative memory using the correlation matrix cannot memorize the sparsely encoded patterns.

Thus, it can be concluded that, for the associative memory to be used in the connectionist model, the associative memory using the covariance matrix is most appropriate among the conventionally available associative memories.

<<The associative memory using the covariance matrix>>

The associative memory using the covariance matrix has been proposed for the purpose of memorizing the random sparsely encoded patterns. (See, S. Amari, "Neural Theory of Association and Concept-Formation", Biological Cybernetics, Vol. 26, pp. 175–185, 1977; S. Amari, "Characteristics of Sparsely Encoded Associative Memory", Neural Networks, Vol. 2, pp. 451–457, 1989; and C. J. Perez-Vicente, "Finite-Size Capacity of Sparse-Coding Models", Europhysics Letters, Vol. 10, pp. 627–631, 1989, for further details.) This associative memory sequentially selects one node at random from N nodes, and updates the activation value according to the following expression (1).

$$V_j \leftarrow f\left(\sum_i W_{ji}(V_i - a_i) - I_j\right) \quad (1)$$

where $V_j$ is an activation value of the j-th node, $a_i$ is an activation probability for the activation value $V_i$ of the i-th node to be 1, $I_j$ is a threshold for the j-th node, f is a threshold function which can be expressed by the following equation (2):

$$f(u) = \begin{cases} 1 \text{ if } u \geq 0 \\ 0 \text{ if } u < 0 \end{cases} \quad (2)$$

and WJi is a link weight value for a link between the j-th node and the i-th node which is updated according to the following expression (3):

$$W_{ji} \leftarrow \begin{cases} (1-\Delta)W_{ji} + \Delta(V_j - a_j)(V_i - a_i) \text{ if } j \neq i \\ 0 \text{ if } j = i \end{cases} \quad (3)$$

where $\Delta$ is a small constant $0 < \Delta \ll 1$.

This updating of the activation value is repeated until the activation values of all the N nodes become stable.

More specifically, the learning of links in the conventional associative memory using the covariance matrix will be described in detail with references to FIG. 2 and FIG. 3, where FIG. 2 shows a configuration of an apparatus for learning of the links in the associative memory, and FIG. 3 shows a flow chart for the learning operation of this apparatus of FIG. 2.

In this apparatus of FIG. 2, the link weight values of the network and the activation probabilities at the nodes are learned. To this end, the apparatus comprises: a pattern presentation unit 41 for presenting each pattern to be learned; an activation probability updating unit 42 for updating the activation probability of each node according to the pattern presented by the pattern presentation unit 41 and the former activation probabilities; an activation probability storing unit 43 for storing the activation probabilities updated by the activation probability updating unit 42 and supplying formerly stored activation probabilities as the former activation probabilities to the activation probability updating unit 42 at a time of updating; an activation probability read out unit 44 for reading out the activation probabilities stored in the activation probability storing unit 43; a link weight value learning unit 45 for learning the link weight value of each link according to the pattern presented by the pattern presentation unit 41, the former link weight values, and the former activation probabilities supplied from the activation probability storing unit 43; a link weight value storing unit 46 for storing the link weight values learned by the link weight value learning unit 45 and supplying formerly stored link weight values as the former link weight values to the link weight value learning unit 45 at a time of learning; a link weight value read out unit 47 for reading out the link weight values stored in the link weight value storing unit 46; and an initialization commanding unit 48 for issuing an initialization command for resetting the activation probabilities stored in the activation probability storing unit 43 and the link weight values stored in the link weight value storing unit 46 to initial values 0.

More specifically, in this apparatus of FIG. 2, the learning operation is carried out according to the flow chart of FIG. 3 as follows.

Namely, indices j and i are initialized to 1 at the steps 501 and 502, respectively, and the link weight value $W_{ji}$ is initialized to 0 at the step 503.

Next, the index i is incremented by one at the step 504, and whether the incremented index i is less than or equal to N or not is determined at the step 505, and then the steps 503 and 504 are repeated until the index i reaches to N.

After the steps 503 and 504 are repeated for the index i equal to N, an activation probability $a_j$ is initialized to 0 at the step 506 and the index j is incremented by one at the step 507. Then, whether the incremented index j is less than or equal to N or not is determined at the step 508, and then the steps 502 to 508 are repeated until the index j reaches to N so as to complete the initialization routine of the steps 501 to 508.

Next, at the step 509, whether there is any pattern to be learned or not is determined such that the learning routine of the following steps 510 to 522 are repeated as long as there is a pattern to be learned.

At the step 510, the pattern V to be learned is entered, and the indices j and i are initialized to 1 again at the steps 511 and 512, respectively.

Then, whether the indices 1 and j are equal to each other or not is determined at the step 513. In a case these indices i and j are not equal, next at the step 514, the link weight value $W_j$ is updated according to the expression (3) for a case of i≠j, described above. This step 514 is skipped in a case these indices i and j are equal as $W_{ii}$ is to remain at zero according to the expression (3).

Next at the step 515, the index i is incremented by one, and whether the incremented index i is less than or equal to N or not is determined at the step 516, and then the steps 513 to 516 are repeated until the index i reaches to N.

After the steps 513 to 516 are repeated for the index i equal to N, the index j is incremented by one at the step 517, and whether the incremented index j is less than or equal to N or not is determined at the step 518, and then the steps 512 to 518 are repeated until the index j reaches to N so as to complete the updating of the link weight value $W_{ji}$.

Next, at the step 519, the index j is initialized to 1 again, and then, at the step 520, the activation probability $a_j$ is updated according to the following expression (4).

$$a_j \leftarrow (1-\Delta)a_j + \Delta V_j \quad (4)$$

Next, at the step 521, the index j is incremented by one, and whether the incremented index j is less than or equal to N or not is determined at the step 522, and then the steps 520 to 522 are repeated until the index j reaches to N so as to complete the updating of the activation probability $a_j$.

After the steps 520 to 522 are repeated for the index j equal to N, the operation returns to the step 509 described above, so as to proceed to the learning routine of the steps 510 to 522 for a next pattern to be learned.

When the learning routine is completed for all the patterns to be learned, the link weight values no longer change so that the operation proceeds to the step 523 at which the updated link weight value $W_{ji}$ and the updated activation probability $a_j$ are stored in the link weight value storing unit 46 and the activation probability storing unit 43, respectively, in correspondence with each other, and the learning operation terminates.

Now, it can be verified that, in the above described learning scheme of the conventional associative memory using the covariance matrix, the first four of the six characteristics P1 to P6 of the patterns in the connectionist model described above can be accounted. Namely, the memorized pattern is learned as the link weight value so that the characteristic P1 is accounted. Also, this associative memory using the covariance matrix is originally devised for the memorization of the random sparsely encoded patterns, so that it is certainly suitable for the sparsely encoded patterns as required by the characteristic P2. Also, the characteristic P3 is accounted by the introduction of the activation probability afor the activation value. Also, the additional learning of the memorization pattern is possible as can be seen in the expression (3), so that the characteristic P4 is also accounted.

However, the last two of the six characteristics P1 to P6 of the patterns in the connectionist model cannot be accounted in the above described learning scheme of the conventional associative memory using the covariance matrix.

First, this associative memory is not suitable for a case in which the frequencies of appearances for the patterns are non-random as required by the characteristic P5 for the following reason. Namely, this associative memory has a tendency to memorize only the frequently appearing patterns. This fact can be seen from the expression (3) for updating the link weight value in which an updating value $(V_j-a_j)(V_i-a_i)$ for the newly presented pattern is added to the former link weight value $W_{ji}$ every time a new pattern is presented. As a consequence, the more frequently appearing pattern will have the larger link weight value, so that the more frequently appearing pattern is more likely recalled, while the less frequently appearing pattern is less likely recalled because the less frequently appearing pattern has been learned only very rarely.

This fact that this associative memory has a tendency to memorize only the frequently appearing patterns can be explained in terms of the so called energy surfaces for the patterns. Here, the energy E of a pattern V is defined by the following equation (5).

$$E = k \left\{ \sum_j \sum_i W_{ji}(V_j - a_j)(V_i - a_i) \right\} \quad (5)$$

where k is assumed to be a negative constant coefficient in the following. Namely, as shown in FIG. 4A in which the energy surfaces (reduced to two dimensions for simplicity) for the patterns V are plotted, the energy is lower for the more frequently appearing pattern-A compared with the less frequently appearing pattern-B. The associative memory is more likely to fall into the lower energy state, so that only the more frequently appearing pattern-A having the lower energy will most likely be recalled while the less frequently appearing pattern-B having the higher energy will be highly unlikely to be recalled.

Next, this associative memory is also not suitable for a case in which the correlations among the patterns are non-random as required by the characteristic P6. In fact, this associative memory is suited only to a case of a uniform correlation among the patterns such as that of the random sparsely encoded patterns.

In this case, the problem is actually two folds. In the first place, there is a problem that an intermediate pattern of a plurality of strongly correlated learning patterns is recalled rather than the desired pattern. However, this problem is not so serious because this problem itself is absent when the correlation is not so strong, while the intermediate pattern will not be largely different from the desired pattern when the correlation is indeed strong. Far more serious is the problem that the only weakly correlated pattern cannot be recalled. This fact can also be explained in terms of the energy surfaces for the patterns. Namely, when three patterns-1, -2, and -3 have appeared at the same frequency, the energies of these patterns-1, -2, and -3 are as shown in FIG. 5A. Consequently, the intermediate pattern of the strongly correlated patterns-1 and -2 will be recalled very easily as it is located at a very low energy, but the pattern-3 which is very weakly correlated with the patterns-1 and -2 will be very difficult to recall.

Thus, in the conventional associative memory, it has been difficult to make the appropriate learning for facilitating the desired association function when the patterns has the non-random frequencies of appearances or the non-random correlations.

In other words, the association by an artificial neural network is achieved by updating (propagating) the activation values of the nodes (neurons) such that the energy E is minimized. For this reason, the activation value of each node usually falls into the lower energy states. When the patterns are random, the energies of the patterns are almost identical, so that the activation values of the nodes will fall into the appropriate patterns. However, when the patterns are non-random, the energies of the patterns are diversified, so that the activation values of the nodes will most likely fall into the patterns with the lower energies and the patterns with the higher energies will be difficult to recall.

It is to be noted here that this situation of the conventional associative memories remains the same even when a constant coefficient k is set to be positive.

SUMMARY OF THE INVENTION

It is therefore an object of the present invention to provide a scheme for learning of an associative memory, capable of accounting all of the characteristics P1 to P6 of the patterns in the connectionist model simultaneously.

In further detail, it is an object of the present invention to provide a scheme for learning of an associative memory suitable for the connectionist model which can deal with the patterns having the non-random frequencies of the appearances or the non-random correlations.

According to one aspect of the present invention there is provided an apparatus for learning of an associative memory in a form of a neural network in which a plurality of nodes having activation values are connected by a plurality of links having link weight values, comprising: pattern entering means for sequentially entering a plurality of learning patterns, each learning pattern having a plurality of elements in correspondence with the nodes; energy calculation means for calculating an energy E of said each learning pattern entered by the pattern entering means; learning amount determination means for determining a learning amount $\delta$ for said each learning pattern entered by the pattern entering means, according to a difference between the energy E calculated by the energy calculation means and a predetermined reference energy level Eth; and link weight value updating means for updating the link weight values of the links according to said each learning pattern entered by the pattern entering means and the learning amount $\delta$ determined by the learning amount determination means.

According to another aspect of the present invention there is provided a method of operating an associative memory in a form of a neural network in which a plurality of nodes having activation values are connected by a plurality of links having link weight values, comprising the steps of: (a) entering a plurality of learning patterns sequentially, each learning pattern having a plurality of elements in correspondence with the nodes; (b) calculating an energy E of said each learning pattern entered at the step (a); (c) determining a learning amount $\delta$ for said each learning pattern according to a difference between the energy E calculated at the step (b) and a predetermined reference energy level Eth; (d)

updating the link weight values of the links according to said each learning pattern entered at the step (a) and the learning amount δ determined at the step (c), so as to achieve a learning of the associative memory; (e) presenting an input pattern having a plurality of elements in correspondence with the nodes; (f) updating the activation values of the nodes according to the input pattern presented at the step (e) and the link weight values updated at the step (d); and (g) recalling an appropriate pattern according to the activation values updated at the step (f), so as to achieve an association by the associative memory.

Other features and advantages of the present invention will become apparent from the following description taken in conjunction with the accompanying drawings.

DETAILED DESCRIPTION OF THE PREFERRED EMBODIMENTS

Now, the preferred embodiment of the learning of the associative memory in a form of a neural network according to the present invention will be described in detail.

OUTLINE

Figure 1:
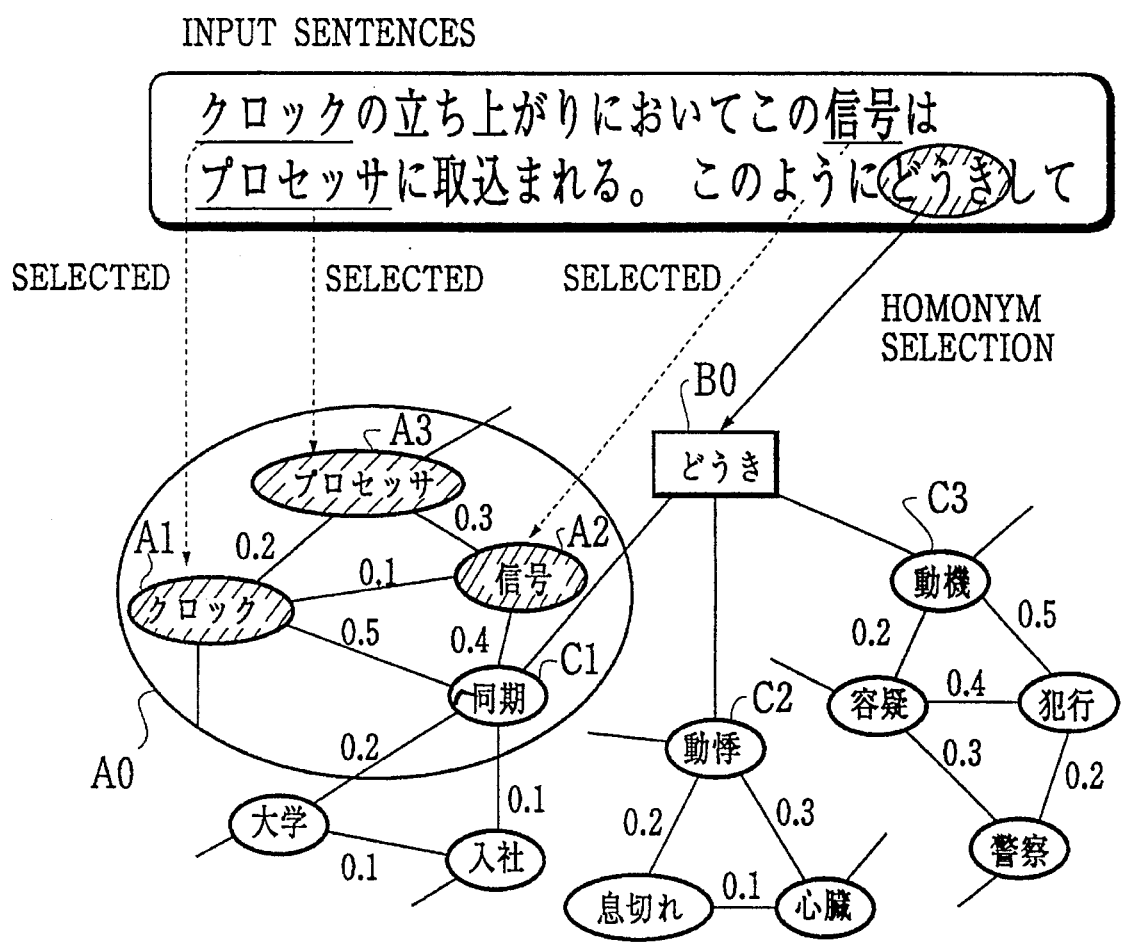
FIG. 1 is a schematic diagram of a network to be utilized in the homonym selection in the conventional kana-kanji conversion.
Figure 2:
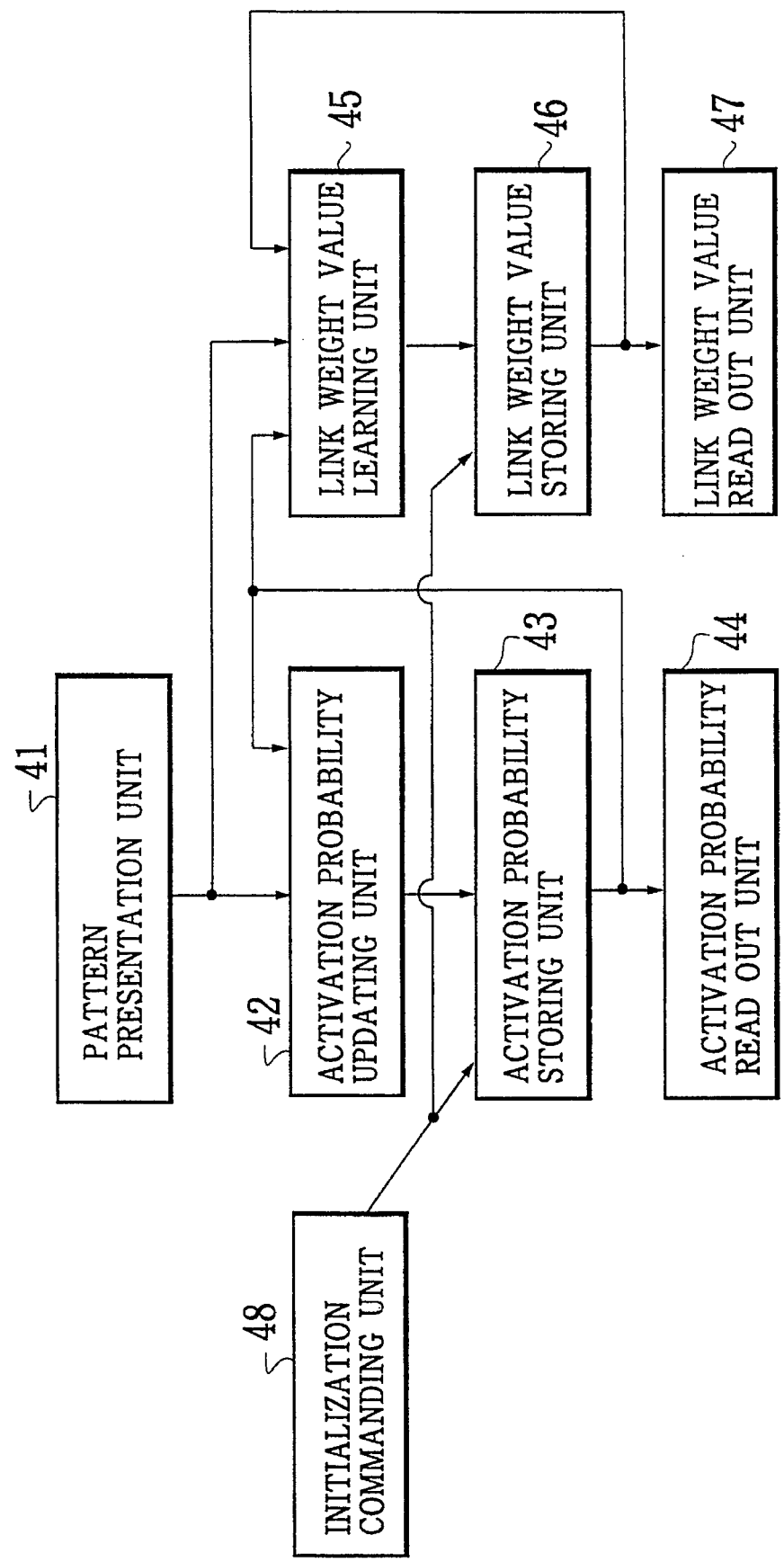
FIG. 2 is a schematic block diagram of a conventional apparatus for learning of the associative memory.
Figure 3:
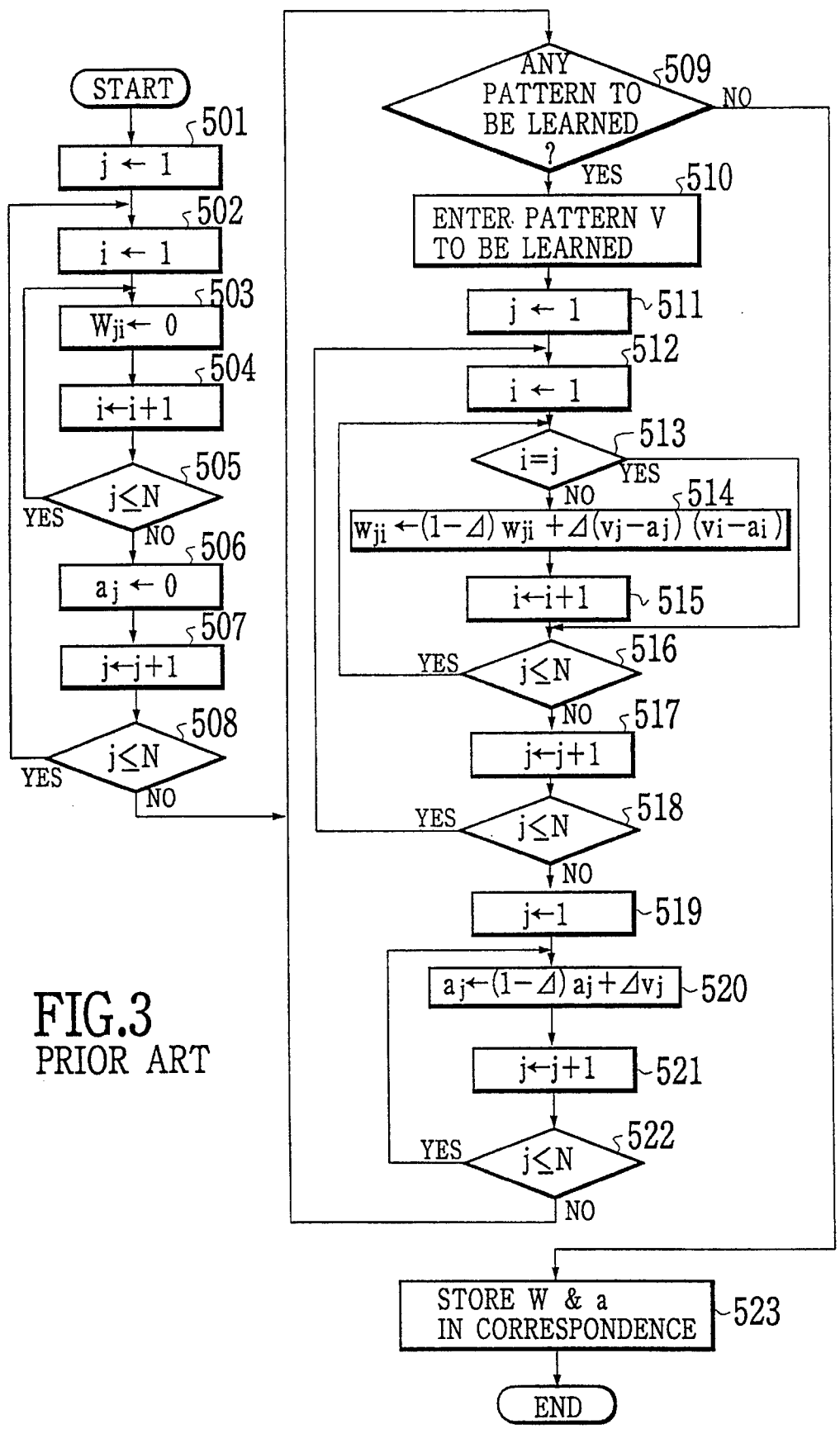
FIG. 3 is a flow chart for the learning operation to be carried out by the apparatus of FIG. 2.
Figure 4A:
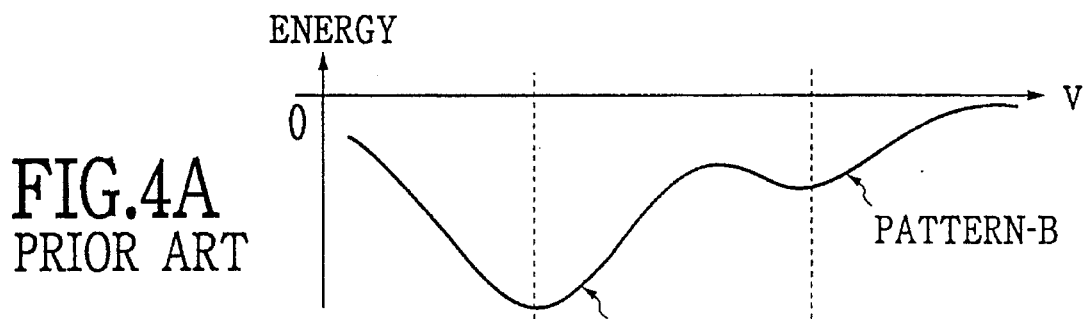
FIG. 4A is a graph of energy surfaces (reduced to two dimensions for simplicity) for exemplary patterns obtainable in the apparatus of FIG. 2.
Figure 4B:
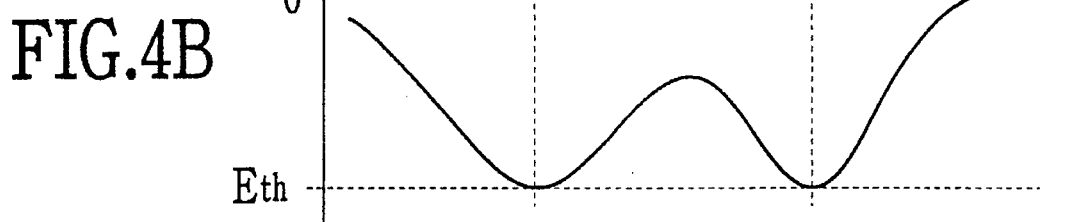
FIG. 4B is a graph of energy surfaces (reduced to two dimensions for simplicity) for exemplary patterns obtainable in apparatus according to the present invention.
Figure 5A:
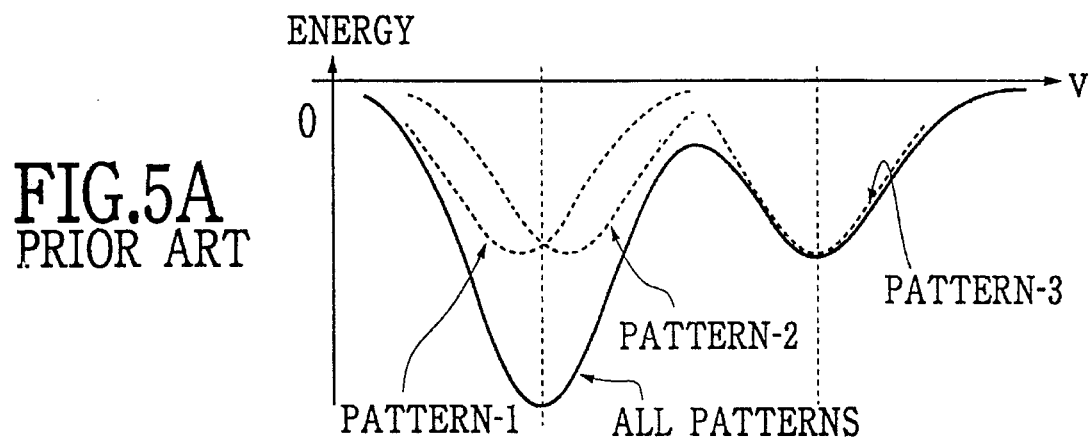
FIG. 5A is another graph of energy surfaces (reduced to two dimensions for simplicity) for exemplary patterns obtainable in the apparatus of FIG. 2.
Figure 5B:
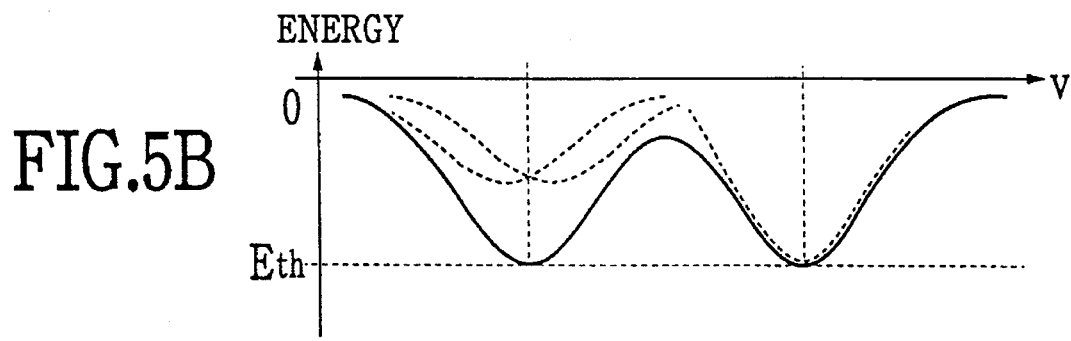
FIG. 5B is another graph of energy surfaces (reduced to two dimensions for simplicity) for exemplary patterns obtainable in the apparatus according to the present invention.

In short, according to the present invention, the learning is made such that the energy for each pattern to be stored is at a level of a predetermined negative constant reference energy level Eth, regardless of what each pattern is, as shown in FIG. 4B and FIG. 5B in contrast to FIG. 4A and FIG. 5A.

To this end, before the learning, the energy of the newly presented pattern is obtained and a learning amount δ is determined according to the energy level of the newly presented pattern relative to the reference energy level Eth. Then, the learning is made according to the determined learning amount δ. Consequently, in the present invention, those patterns that would have been more difficult to learn are learned more intensively, so that it becomes possible to recall all of the non-random patterns appropriately.

Here, it is to be noted that the learning includes not only memorizing of the pattern but also forgetting of the pattern which occurs in a case of the over-learning in which the energy level of the newly presented pattern is already lower than the reference energy level Eth and the learning amount δ becomes negative.

SPECIFIC EMBODIMENT

Figure 6:
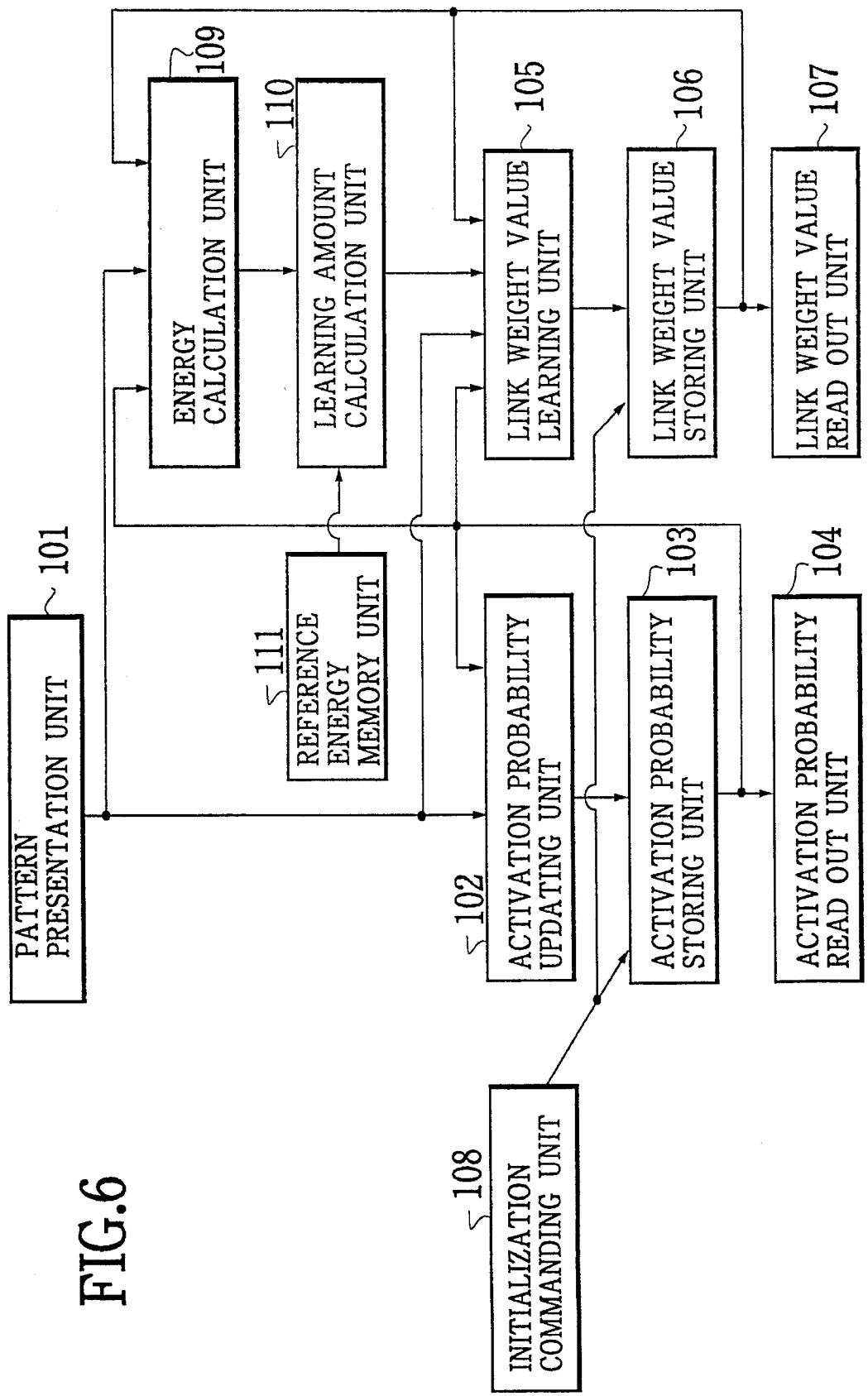
FIG. 6 is a schematic block diagram of one specific embodiment of an apparatus for learning of the associative memory according to the present invention.
Figure 7:
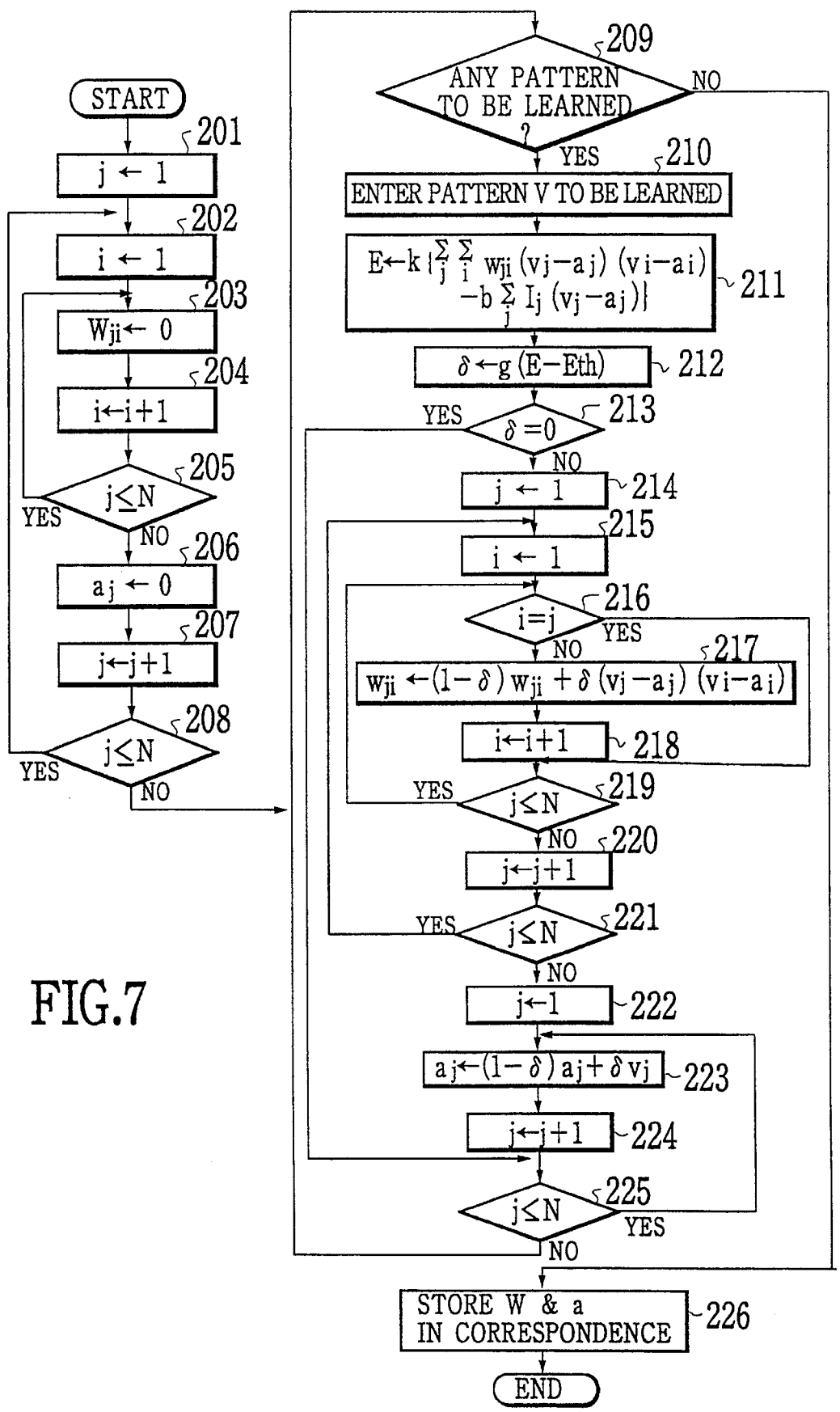
FIG. 7 is a flow chart for the learning operation to be carried out by the apparatus of FIG. 6.

Referring now to FIG. 6 and FIG. 7, a more specific embodiment of the learning of the associative memory in a form of a neural network according to the present invention will be described in detail.

<<Configuration of the apparatus>>

In this embodiment, the apparatus of FIG. 6 comprises: a pattern presentation unit 101 for presenting each pattern to be learned; an activation probability updating unit 102 for updating the activation probability of each node according to the pattern presented by the pattern presentation unit 101 and the former activation probabilities; an activation probability storing unit 103 for storing the activation probabilities updated by the activation probability updating unit 102 and supplying formerly stored activation probabilities as the former activation probabilities to the activation probability updating unit 102 at a time of updating; and an activation probability read out unit 104 for reading out the activation probabilities stored in the activation probability storing unit 103.

In addition, this apparatus of FIG. 6 further comprises: an energy calculation unit 109 for calculating an energy E of the pattern presented by the pattern presentation unit 101 according to the former activation probabilities supplied from the activation probability storing unit 103 and the former link weight values; a reference energy memory unit 111 for storing the predetermined negative constant reference energy level Eth; a learning amount calculation unit 110 for calculating the learning amount δ according to a difference between the energy calculated by the energy calculation unit 109 and the reference energy level stored in the reference energy memory unit 111; a link weight value learning unit 105 for learning the link weight value of each link according to the pattern presented by the pattern presentation unit 101, the learning amount δ calculated by the learning amount calculation unit 110, the former link weight values, and the former activation probabilities supplied from the activation probability storing unit 103; a link weight value storing unit 106 for storing the link weight values learned by the link weight value learning unit 105 and supplying formerly stored link weight values as the former link weight values to the energy calculation unit 109 at a time of an energy calculation as well as to the link weight value learning unit 105 at a time of learning; a link weight value read out unit 107 for reading out the link weight values stored in the link weight value storing unit 106; and an initialization commanding unit 108 for issuing an initialization command for resetting the activation probabilities stored in the activation probability storing unit 103 and the link weight values stored in the link weight value storing unit 106 to initial values 0.

<<Learning operation>>

In this apparatus of FIG. 6, the link weight values of the network and the activation probabilities at the nodes are learned as follows.

Initially, the activation probabilities in the activation probability storing unit 103 and the link weight values in the link weight value storing unit 106 are set to the initial values 0 by the initialization command issued from the initialization commanding unit 108.

Then, as a pattern V to be learned is presented by the pattern presentation unit 101, the energy calculation unit 109 calculates the energy E of this pattern V (bit pattern) to be learned according to the former activation probabilities supplied from the activation probability storing unit 103 and the former link weight values supplied from the link weight value storing unit 106, by the following equation (6).

$$E = k \left\{ \sum_j \sum_i W_{ji}(V_j - a_j)(V_i - a_i) - b \sum_j I_j(V_j - a_j) \right\} \quad (6)$$

where k is a non-zero constant coefficient having a sign identical to that of the reference energy level Eth, $W_{ji}$ is a link weight value for a link between the j-th node and the i-th node, $V_j$ is an activation value of the j-th node in the pattern V, $V_i$ is an activation value of the i-th node in the pattern V, $a_j$ is an activation probability for the activation value $V_j$ of the j-th node in the pattern V to be 1 (i.e., for the j-th node to be activated), $a_i$ is an activation probability for the activation value $V_i$ of the i-th node in the pattern V to be 1, $I_j$ is a predetermined threshold for the j-th node, and b is a constant coefficient which is most preferably equal to 2.

Next, the learning amount calculation unit 110 calculates the learning amount δ according to a difference between the energy calculated by the energy calculation unit 109 and the reference energy level stored in the reference energy memory unit 111, by the following equation (7).

$$\delta = g(E - Eth) \quad (7)$$

where g is an upper and lower bounded monotonically increasing function with g(0)=0.

Then, the link weight value learning unit 105 updates the link weight value $W_{ji}$ of each link according to the pattern V presented by the pattern presentation unit 101, the learning amount δ calculated by the learning amount calculation unit 110, the former link weight values supplied from the link weight value storing unit 106, and the former activation probabilities supplied from the activation probability storing unit 103, by the following formula (8):

$$W_{ji} \leftarrow \begin{cases} (1-\delta)W_{ji} + \delta(V_j - a_j)(V_i - a_i) & \text{if } j \neq i \\ 0 & \text{if } j = i \end{cases} \quad (8)$$

and stores the updated link weight value $W_i$ in the link weight value storing unit 106.

Meanwhile, the activation probability updating unit 102 updates the activation probability of each node according to the pattern V presented by the pattern presentation unit 101 and the former activation probabilities supplied from the activation probability storing unit 103, by the following formula (9):

$$a_j \leftarrow (1-\delta)a_j + \delta V_j \quad (9)$$

and stores the updated activation probability in the activation probability storing unit 103.

Here, it is to be noted that the activation probability may not necessarily be updated every time a new pattern V to be learned is presented by the pattern presentation unit 101, and the present invention is effective even when the activation probability is set to a predetermined fixed value such as 0.5.

More specifically, in this apparatus of FIG. 6, the learning operation is carried out according to the flow chart of FIG. 7 as follows.

Namely, indices J and i are initialized to 1 at the steps 201 and 202, respectively, and the link weight value $W_{ji}$ is initialized to 0 at the step 203.

Next, the index i is incremented by one at the step 204, and whether the incremented index i is less than or equal to N is determined at the step 205, and then the steps 203 and 204 are repeated until the index i reaches to N.

After the steps 203 and 204 are repeated for the index i equal to N, an activation probability at is initialized to 0 at the step 206 and the index j is incremented by one at the step 207. Then, whether the incremented index j is less than or equal to N is determined at the step 208, and then the steps 202 to 208 are repeated until the index j reaches to N so as to complete the initialization routine of the steps 201 to 208.

Next, at the step 209, whether there is any pattern to be learned or not is determined such that the learning routine of the following steps 210 to 225 are repeated as long as there is a pattern to be learned.

At the step 210, the pattern V to be learned is entered, and the energy E of the entered pattern V is calculated according to the above described equation (6) at the step 211, and then the learning amount δ is calculated according to the above described equation (7) at the step 212.

Then, whether the learning amount δ calculated at the step 212 is equal to zero or not is determined at the step 213. In a case the learning amount δ is equal to zero, the process proceeds to the step 225 described below, whereas otherwise the indices j and i are initialized to 1 again at the steps 214 and 215, respectively.

Then, whether the indices i and j are equal to each other or not is determined at the step 216. In a case these indices i and j are not equal, next at the step 217, the link weight value $W_{ji}$ is updated according to the expression (8) for a case of i≠j, described above. This step 217 is skipped in a case these indices i and j are equal, as $W_{ii}$ is to remain at zero according to the expression (8).

Next at the step 218, the index i is incremented by one, and whether the incremented index i is less than or equal to N or not is determined at the step 219, and then the steps 216 to 219 are repeated until the index i reaches to N.

After the steps 216 to 219 are repeated for the index i equal to N, the index j is incremented by one at the step 220, and whether the incremented index j is less than or equal to N or not is determined at the step 221, and then the steps 215 to 221 are repeated until the index j reaches to N so as to complete the updating of the link weight value $W_{ji}$.

Next, at the step 222, the index j is initialized to 1 again, and then, at the step 223, the activation probability $a_j$ is gradually updated according to the above described expression (9).

Next at the step 224, the index j is incremented by one, and whether the incremented index j is less than or equal to N or not is determined at the step 225, and then the steps 223 to 225 are repeated until the index j reaches to N so as to complete the updating of the activation probability $a_j$.

After the steps 223 to 225 are repeated for the index j equal to N, the operation returns to the step 209 described above, so as to proceeds to the learning routine of the steps 210 to 225 for a next pattern to be learned.

When the learning routine is completed for all the patterns to be learned, the link weight values no longer change so that the operation proceeds to the step 226 at which the updated link weight value $W_{ji}$ and the updated activation probability $a_j$ are stored in the link weight value storing unit 106 and the activation probability storing unit 103, respectively, in correspondence with each other, and the learning operation terminates.

It is to be noted here that, in this learning operation, the learning amount δ which varies according to the energy E of the pattern V to be learned replaces a constant Δ used in the conventional learning operation in the conventional associative memory. Consequently, whenever δ=0, the steps 214 to 224 can be skipped as the link weight value and the activation probability are unchanged in such a case. However, in a case the function g(x) becomes equal to zero only when its argument x is equal to zero, the possibility for the argument x of this function g(x) to be zero is quite low, so that the effect of the skipping of these steps 214 to 224 is not very large. In such a case, however, it is possible to increase the possibility for this function g(x) to take a value of zero by making this function g(x) equal to zero whenever its argument is sufficiently close to zero. In this manner, it becomes possible increase the possibility to omit the updating of the link weight value and the activation probability, such that the overall learning speed can be made to be a high speed.

<<Association operation>>

After this learning operation is completed, the activation probabilities stored in the activation probability storing unit 103 and the link weight values stored in the link weight value storing unit 106 can be read out by the activation probability read out unit 104 and the link weight value read out unit 106, respectively, and loaded to the network forming the associative memory for the purpose of carrying out the following association operation by the associative memory.

Namely, in this network forming the associative memory, each symbol is represented by a node, and relationships among symbols are represented by the links connecting the nodes together, in which the symbol represented by the node having the highest activation value is recalled by propagating activation values assigned to the nodes through the network. Here, the propagation of the activation value is carried out through the links, where a link with a larger link weight value can propagate a larger part of the activation value.

Thus, as the new pattern is presented, the activation values are propagated in the network to raise the activation values of the nodes corresponding to those nodes which are strongly related to the newly presented pattern. Then, the symbol represented by the node having the highest activation value is recalled.

More specifically, in this network forming the associative memory, one node is sequentially selected at random from N nodes of the newly presented pattern, and the activation value of the selected node is updated according to the following formula (10).

$$V_j' \leftarrow f\left( \sum_i W_{ji}(V_i' - a_i) - I_j \right) \quad (10)$$

where $V_j'$ is an activation value of the j-th node of the network, $V_i'$ is an activation value of the i-th node of the newly presented pattern, $a_i$ is an activation probability of for the activation value $V_i'$ of the i-th node of the newly presented pattern to be 1 which has been determined according to the above equation (9) in the learning operation described above, $I_j$ is a threshold for the j-th node, f is a threshold function which can be expressed by the following equation (11):

$$f(u) = \begin{cases} 1 \text{ if } u \geq 0 \\ 0 \text{ if } u < 0 \end{cases} \quad (11)$$

This updating of the activation value is repeated until the activation values of all the N nodes become stable.

APPLICATIONS

<<Application to the kana-kanji conversion in the Japanese word processing>>

A specific example in which this associative memory in a form of a neural network of this embodiment can be applied is the kana-kanji conversion in the Japanese word processing based on the connectionist model, in which the learning of the network is carried out by using a large number of actual documents in which the kana-kanji conversion has already been completed. Then, in the association operation, the activation values of the nodes are propagated in response to the input information entered by the user as a key, such that the topic of the input document can be comprehended, and the accuracy of the kana-kanji conversion is improved by making a proper selection of the most appropriate homonym according to the comprehended topic of the input document.

In this case, the learning is made by the following procedure.

(1) Dividing entered documents to be learned in units of paragraphs.

(2) Decomposing each paragraph into words, and converting each word into its word code.

(3) For each paragraph, producing the bit pattern by setting a bit of the bit sequence corresponding to the word code of the word contained in this paragraph to 1, while setting a bit of the bit sequence corresponding to the word code of the word not contained in this paragraph to 0.

(4) Carrying out the learning of the link weight values $W_{ji}$ and the activation probabilities $a_j$ by using the apparatus of this embodiment as described above.

Then, after the learning operation is completed, the kana-kanji conversion utilizing the association operation by the associative memory is carried out as follows.

First, the activation value $V_j$ of the j-th node is set to be $V_j=a_j$ initially, while the link weight values and the activation probability $a_j$ obtained by the learning operation are read out by the link weight value read out unit 107 and the activation probability read out unit 104, respectively, and loaded to the network forming the associative memory.

Then, a series of kanas (Japanese syllabaries) representing a reading of desired words is entered by the user, and an appropriate letter series using both kanas and kanjis (Chinese characters) with appropriate portions of the entered kana series converted into kanjis is returned in response by the system, in which the homonym selection is made by recalling the symbol represented by the node having the highest activation value. Here, in a case the user accepted the particular kana-kanji conversion candidate with the word code j returned from the system by pressing a selection key, the threshold $I_j$ in the expression (10) described above is made smaller, such that the activation value $V_j$ of the j-th node is raised. On the other hand, in a case the user rejected the particular kana-kanji conversion candidate with the word code j returned from the system by pressing a next candidate key, this threshold $I_j$ in the expression (10) described above is made larger, such that the activation value $V_j$ of the j-th node is lowered.

Thereafter the updating of the activation values of the nodes is continued, by using the link weight values $W_{ji}$ and the activation probabilities $a_j$ obtained by the learning operation, and the updated activation values are propagated through the network.

Then, at a time of the kana-kanji conversion, a homonym having the highest activation value among the homonyms is regarded as the most appropriate for the current topic, and selected as the primary candidate for the kana-kanji conversion.

<<Application to the translation word selection in the natural language translation>>

Another specific example in which this associative memory in a form of a neural network of this embodiment can be applied is the translation word selection in the natural language translation from the first natural language (input language) to the second natural language (output language), such as the English to Japanese translation for example. In this case, the ambiguity concerning the meaning of the word in the input language must be resolved in order to arrive at the appropriate translation word in the output language.

For example, consider a case in which the following sentence in English is entered as the input sentence.

"The boys hasten to the playground with bats, bails, and gloves."

In this case, this input sentence contains the following multivocal words:

"bat" which can mean either a baseball bat or a mammal bat in a sense of flittermouse;

"ball" which can mean either a ball used in the baseball or a dancing party; and "glove" which can either mean a baseball glove or a glove as an ordinary outfit for protection against the cold.

In each of these multivocal words, the appropriate translation word in Japanese changes according to what the meaning of each multivocal word is.

Consequently, it is impossible to produce the appropriate Japanese translation of this input sentence unambiguously by a straightforward parsing the syntax and parts of speeches or a simple word to word substitution. In such a situation, it becomes necessary to select the appropriate translation words in view of the context of the input sentence by using the cognition and comprehension scheme based on the connectionist model.

Figure 8:
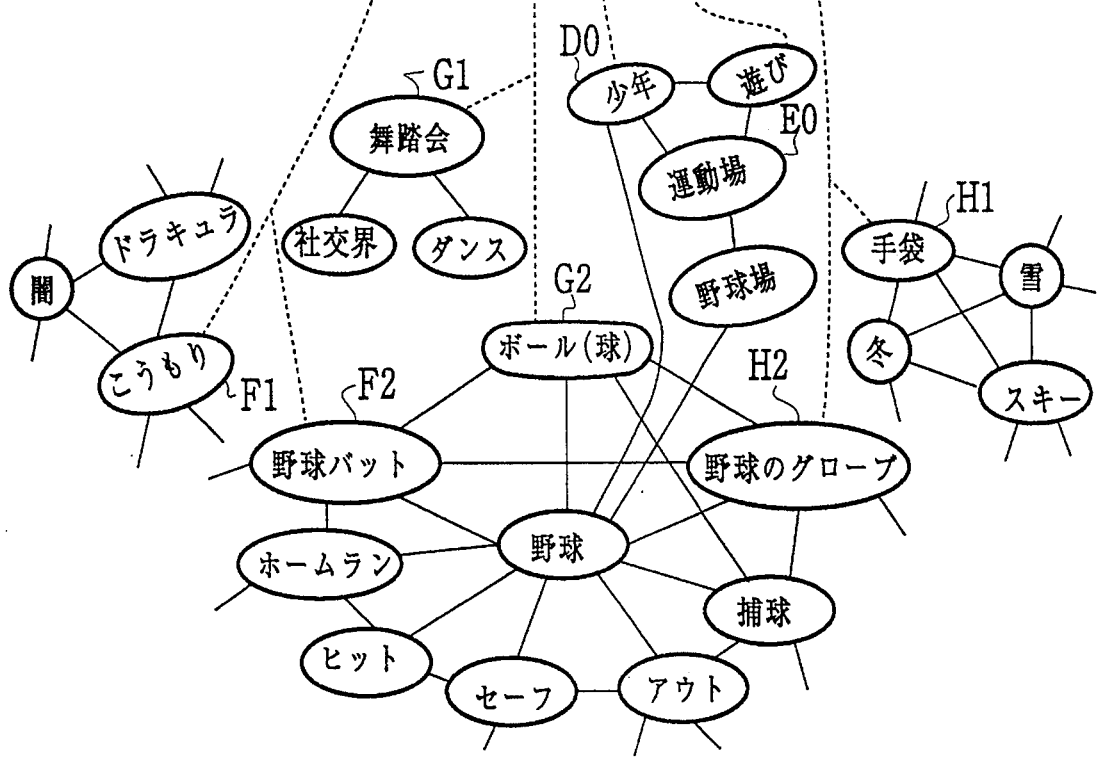
FIG. 8 is a schematic diagram of a network to be utilized in the translation word selection in the natural language translation using the present invention.

In order to enable this selection, there is provided a network indicating proximities of words defined in terms of their usages in the output language (Japanese), as shown in FIG. 8 for the above described exemplary input sentence, in which a link with a large positive link weight value is formed between two nodes corresponding to two words which are frequently used together. In this network shown in FIG. 8, the nodes representing closely related words are connected by the link having a positive link weight value determined in accordance with the proximity of these words. In practice, the nodes representing remotely related words are also connected by the link having a negative link weight value determined in accordance with the remoteness of these words, although these negative links are omitted in FIG. 8 for the sake of clarify.

In this case, the learning to determine the link weight values $W_{ji}$ and the activation probabilities $a_j$ for this network in the output language is made by the procedure similar to that described above for the case of the kana-kanji conversion.

Then, after the learning operation is completed, the translation word selection utilizing the association operation by the associative memory is carried out as follows.

First, the activation value $V_j$ of the j-th node is set to be $V_j=a_j$ initially, while the link weight values $W_{ji}$ and the activation probability $a_j$ obtained by the learning operation are read out by the link weight value read out unit 107 and the activation probability read out unit 104, respectively, and loaded to the network forming the associative memory. Then, when a particular sentence related to a current topic is translated properly, the activation values of the nodes corresponding to the selected translation words of the translated sentence are raised by lowering their thresholds, such that the raised activation values are propagated from these nodes to the other nodes linked with these nodes, and the activation values of the nodes corresponding to the words related to the current topic are also raised as a result. Here, the propagation of the activation value is carried out through the links, where a link with a larger link weight value can propagate a larger part of the activation value.

Thereafter the updating of the activation values of the nodes is continued, by using the link weight values and the activation probabilities $a_j$ obtained by the learning operation, and the updated activation values are propagated through the network.

Then, when there is an ambiguity concerning the meaning of a word in the input sentence even after the syntactic parsing, a translation word having the highest activation value among the translation word candidates is regarded as the most appropriate for the current topic, and selected as the primary candidate for the translation word.

In a case of the above described example of FIG. 8, with respect to the input sentence "The boys hasten to the playground with bats, balls, and gloves.", the word "boys" has an unambiguous meaning so that the translation word DO can be specified uniquely, while the word "playground" also has an unambiguous meaning so that the translation word EO can also be specified uniquely. However, the multivocal word "bats" can correspond either to the translation word candidate F1 representing a mammal bat in a sense of flittermouse or to the translation word candidate F2 representing a baseball bat. Similarly, the multivocal word "balls" can correspond either to the translation word candidate G1 representing a dancing party or to the translation word candidate G2 representing a ball used in the baseball, while the multivocal word "gloves" can correspond either to the translation word candidate H1 representing a glove as an ordinary outfit for protection against the cold or to the translation word candidate H2 representing a baseball glove.

In this case, however, the unique translation word selection of the words "boys" and "playground" suggests a topic of this input sentence to be baseball related, so that the activation values of the nodes representing the baseball related vocabularies have been raised in response to the unique translation word selection of the words "boys" and "playground", so that the translation word candidates F2, G2, and H2 which belong to the baseball related vocabulary will be selected as the appropriate translation words for the multivocal words "bats", "balls", and "gloves".

TEST RESULTS

<<Tests with non-random frequencies of appearances>>

In order to verify the effectiveness of the method and the apparatus of the present invention described above, the specific embodiment of the associative memory according to the present invention described above was tested under a condition satisfying the fifth characteristic P5 of the patterns in the connectionist model which requires the existence of the non-random frequencies of appearances for the patterns. For the sake of comparison, the same test was also conducted with the conventional associative memory using the covariance matrix which is considered to be most effective among the conventionally available associative memories.

In this case, there are three parameters including the number of learnings, the noise, and the link density.

The number of learnings parameter indicates a number of pattern presentations for the purpose of the learning of the link weight values.

The noise parameter indicates the noise contained in the learning patterns used in the learning and the initial pattern used in the test of recalling function. In the connectioninst model, data are usually given in a predetermined unit such as a paragraph, so that the number of nodes having their activation values in the activated state is proportional to the amount of data given. Consequently, regardless of the presence or the absence of the noise, the number of the activated nodes in the pattern can be considered as invariable. Here, the noise parameter taking a value of n ($0 \leq n < 1$) implies that the activation values of the nodes which are supposed to be equal to 1 (activated) are switched to 0 (not activated) at the probability of n, while the activation values of the nodes which are supposed to be equal to 0 are switched to 1 at the probability of $pn/(1-p)$, where p is an average value of the activation values. In such a case, the expectation value for a rate of the activated nodes in the pattern containing the noise is equal to n, which is equal to the case of the pattern without the noise, as can be seen from the following equation (12).

$$p(1-n) + (1-p)\frac{p}{1-p} n = n \qquad (12)$$

In addition, the expectation value for the Hamming distance between the memorized pattern without the noise and the pattern with the noise n is equal to 2 Npn. Here, the Hamming distance is defined as a number of corresponding elements between two vectors which have the different values, so that the Hamming distance becomes 0 when the two vectors coincide with each other completely while the Hamming distance becomes N when the two vectors with N elements each are completely different in all of the N elements. In other words, the two vectors can be considered as more similar when the Hamming distance between these two vectors is smaller.

The link density parameter indicates a ratio of the number of links in the actual network with respect to a maximum number of links that can be provided in the network when all the nodes of the network are completely connected by the links. In a case the number of nodes is N and the number of links is L, the link density l can be expressed as $l=L/N^2$. Here, in a case of reducing the number of links, the links are disconnected sequentially in an order of the smallness of their link weight values.

As the noiseless memorized patterns, M patterns (M=100) with N elements (nodes) each (N=1000) were randomly generated. Here, the characteristic P2 of the patterns in the connectionist model described above was fulfilled by making each pattern to have only 100 nodes with the activation value equal to 1 among its 1000 nodes. Thus, the average value of the activation value p was equal to 0.1.

For the learning patterns, the noise n was randomly added to the noiseless memorized patterns at a time of the learning. In other words, a scheme to prepare a finite number of the learning pattern sets in advance was not adopted. For this reason, with a certain amount of the noise provided, always different pattern was presented as the learning pattern at every presentation timing. In addition, the appearance probability of the i-th pattern ($1 \leq i \leq M$) was set equal to $2i/\{M(M-1)\}$ such that the appearance probability of the most frequently appearing M-th pattern was 100 times that of the least frequently appearing first pattern.

As the function g for defining the learning amount δ a function expressed by the following equation (13) was used in these tests.

$$g(u) = \begin{cases} 0.0001 & \text{if } u \leq \sqrt{0.1} \\ 0.001 \cdot u^2 & \text{if } 0.1 < u \sqrt{0.1} \\ 0 & \text{if } |u| \leq 0.1 \\ -0.001 \cdot u^2 & \text{if } -\sqrt{0.1} \leq u < -0.1 \\ -0.0001 & \text{if } u \leq -\sqrt{0.1} \end{cases} \qquad (13)$$

Figure 9:
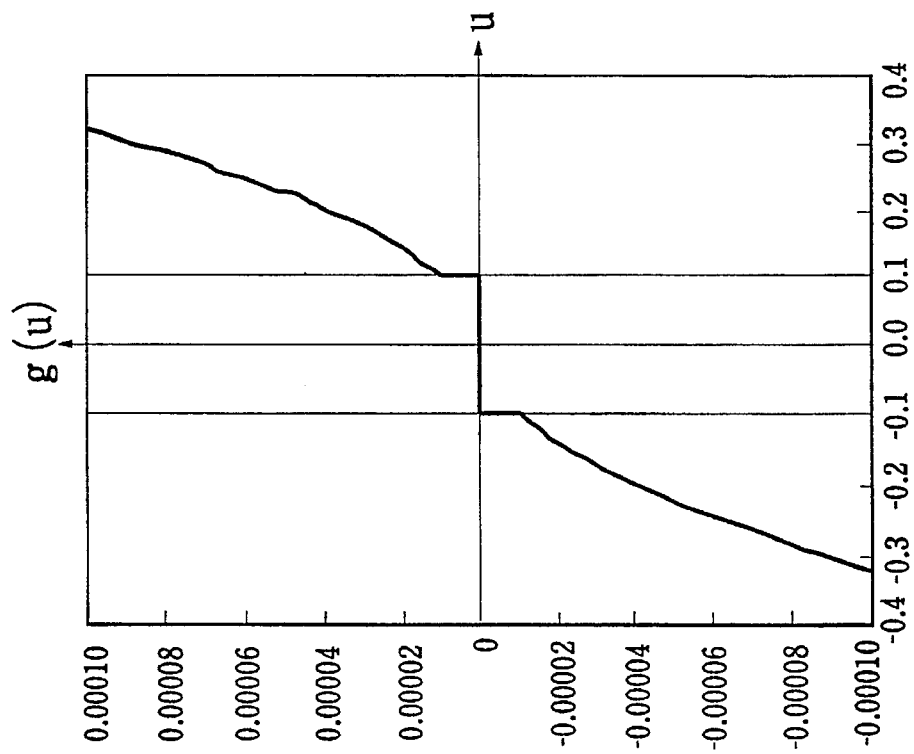
FIG. 9 is a graph of a function g for defining the learning amount in the apparatus of FIG. 6, which is used in tests of the present invention.

A form of this function g(u) of the equation (13) is also depicted in FIG. 9.

The constant coefficient k appearing in the equation (6) was set equal to –½, while the reference energy level Eth was set equal to –1 and the constant coefficient b was set equal to 2.

The evaluation of the performance was made according to the Hamming distance between the noiseless memorized pattern and the pattern recalled by using the noiseless memorized pattern added with the noise as the initial pattern, and this recalling function was repeated for 5000 times under the same condition. The appearance probability and the noise of the presented patterns were the same in both the learning and the recalling. The patterns presented at a time of recalling were also dynamically generated at random, so that they were different from the learning patterns. Also, in general, the average value of the Hamming distance between two random patterns with the activation values equal to p can be expressed as 2 Np(1–p), so that with p=0.1 and N=1000, this average value of the Hamming distance was equal to 180. Consequently, when the Hamming distance between the true pattern and the recalled pattern approaches to 180, the recalling can be considered as a total failure.

Figure 10:
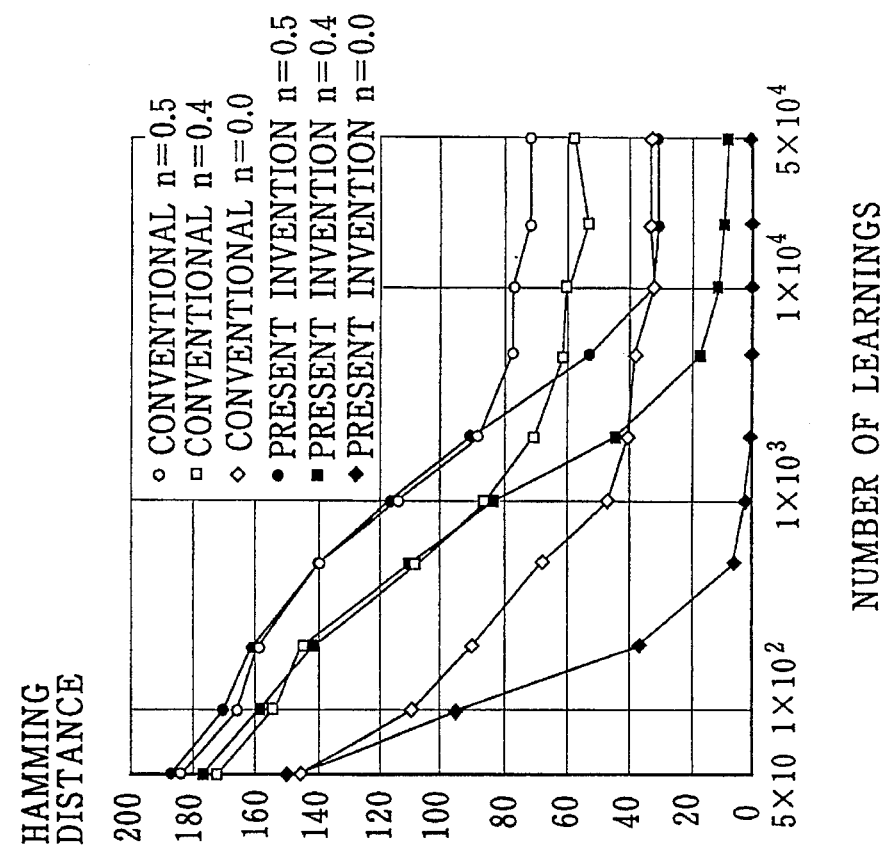
FIG. 10 is a graph of Hamming distance versus number of learnings, showing the result of a test with the non-random frequencies of appearances.

Under such conditions, the recalling performances of the present invention case and the conventional case obtained by varying the number of learnings from 50 to 50000 are indicated in FIG. 10. Here, three different values of 0.0, 0.4, and 0.5 were used for the noise n, and the link density l was set equal to 0.2. It can be seen in FIG. 10 that the recalling performances of the both cases were not much different for relatively small number of learnings, but the recalling performance of the present invention case became significantly superior than the conventional case for the sufficiently large number of learnings.

Figure 11:
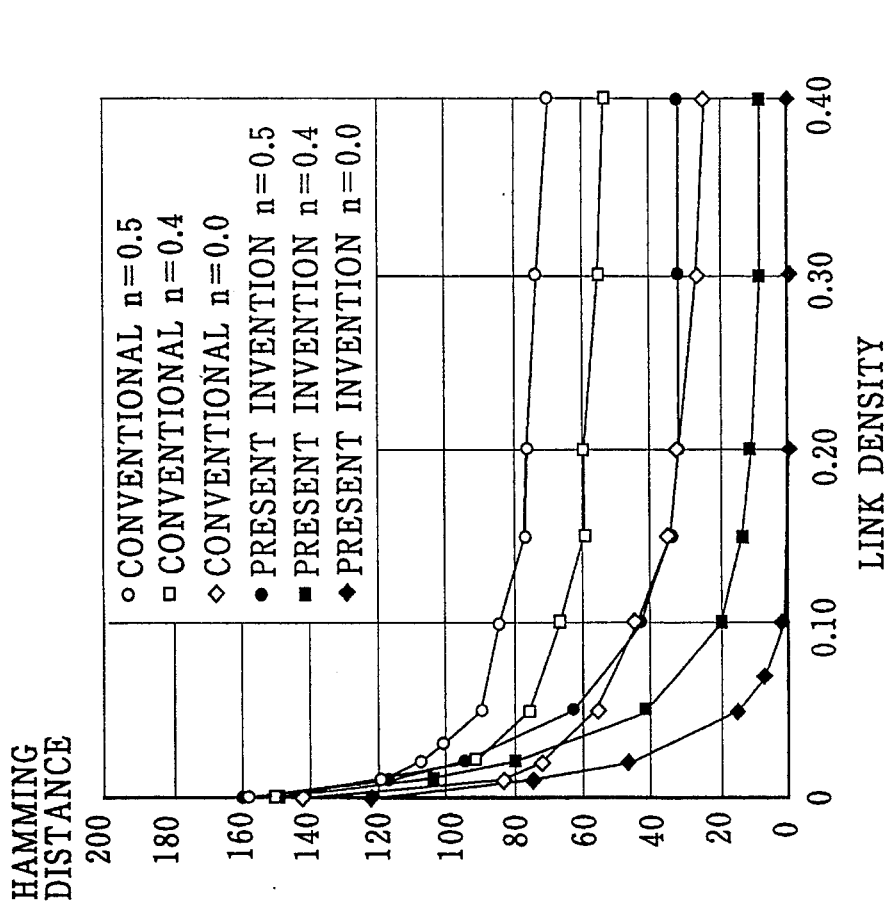
FIG. 11 is a graph of Hamming distance versus link density, showing the result of another test with the non-random frequencies of appearances.

Next, the recalling performances of the present invention case and the conventional case obtained by varying the link density l from 0.001 to 0.4 are indicated in FIG. 11. Here, three different values of 0.0, 0.4, and 0.5 were used for the noise n, and the number of learnings was set equal to 10000. It can be seen in FIG. 11 that the recalling performances of the both cases were improved as the link density l was increased, but the recalling performance of the present invention case was consistently superior than that of the conventional case.

These results of FIG. 10 and FIG. 11 also indicated that the number of learnings parameter equal to 10000 and the link density parameter equal to 0.2 are adequate settings, so that these settings are used in the following tests.

Figure 12:
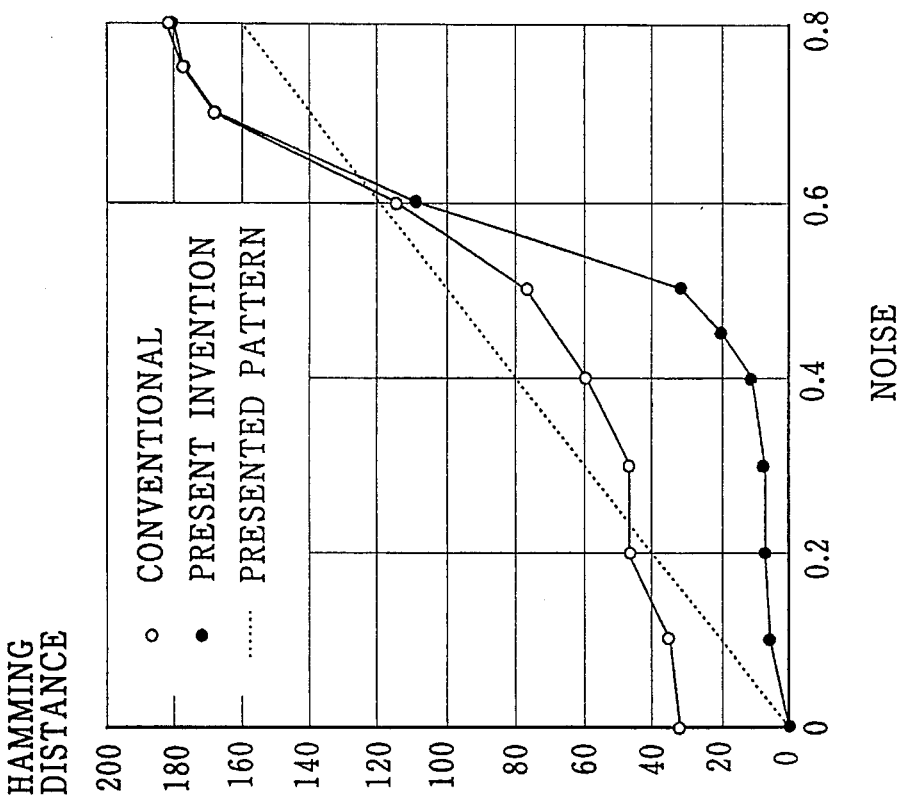
FIG. 12 is a graph of Hamming distance versus noise, showing the result of another test with the non-random frequencies of appearances.

Next, the recalling performances of the present invention case and the conventional case obtained by varying the noise n from 0 to 0.8 are indicated in FIG. 12. It can be seen in FIG. 12 that the recalling performance of the present invention case consistently remained superior than that of the conventional case. In particular, in the conventional case, the less frequently appearing patterns cannot be memorized, so that it was impossible to achieve the perfect recalling even when the noise n was equal to zero. In contrast, in the present invention case, it was possible to improve the recalling performance steadily in accordance with the decrease of the noise. It is also to be noted that the recalling is meaningless unless the Hamming distance with respect to the noiseless memorized pattern is improved for the recalled pattern compared with the initial pattern for which the Hamming distance is indicated by dotted line shown in FIG. 12. In this sense, the conventional case was effective only for the noise n in a range of 0.25 to 0.6, whereas the present invention case was effective for the noise n in a significantly wider range of 0.0 to 0.6.

Figure 13:
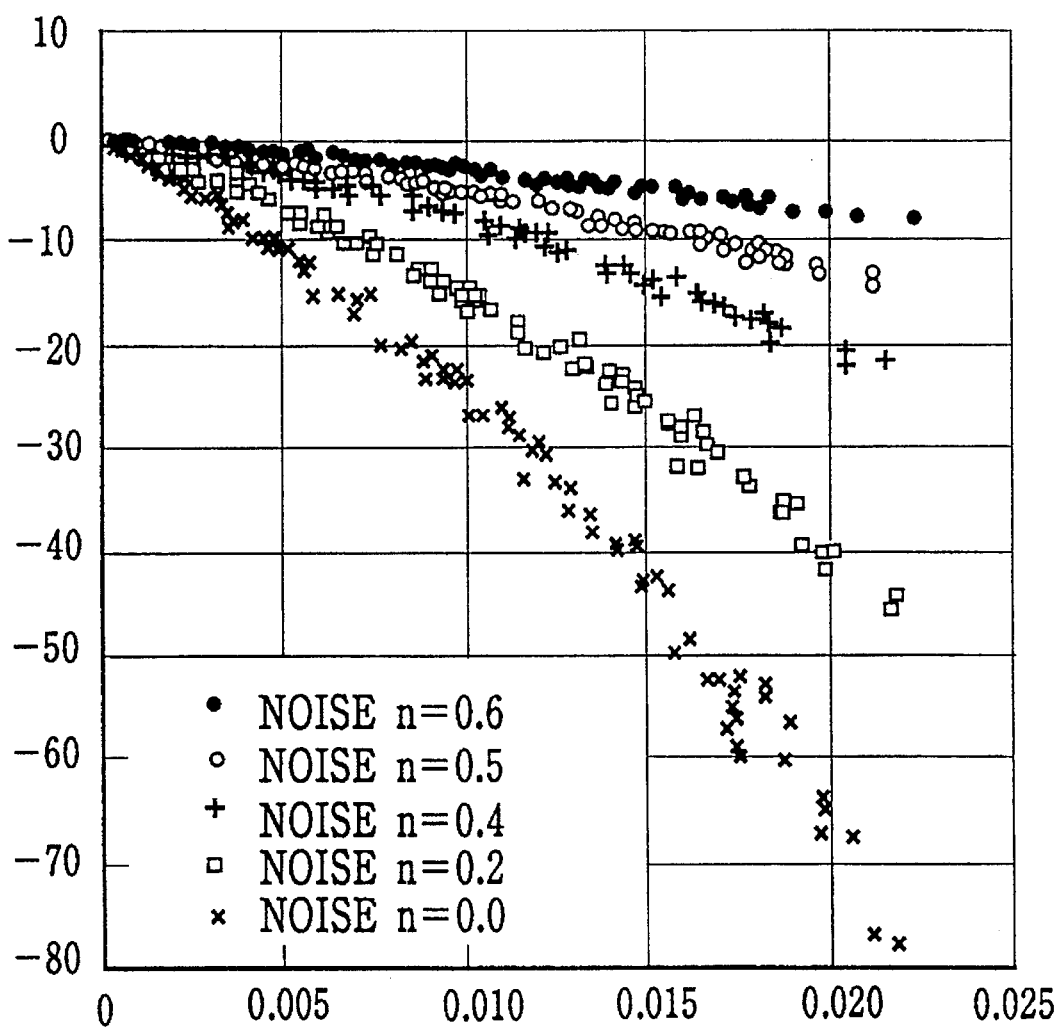
FIG. 13 is a graph of energy versus frequency of presentations, showing the result of another test with the non-random frequencies of appearances.
Figure 14:
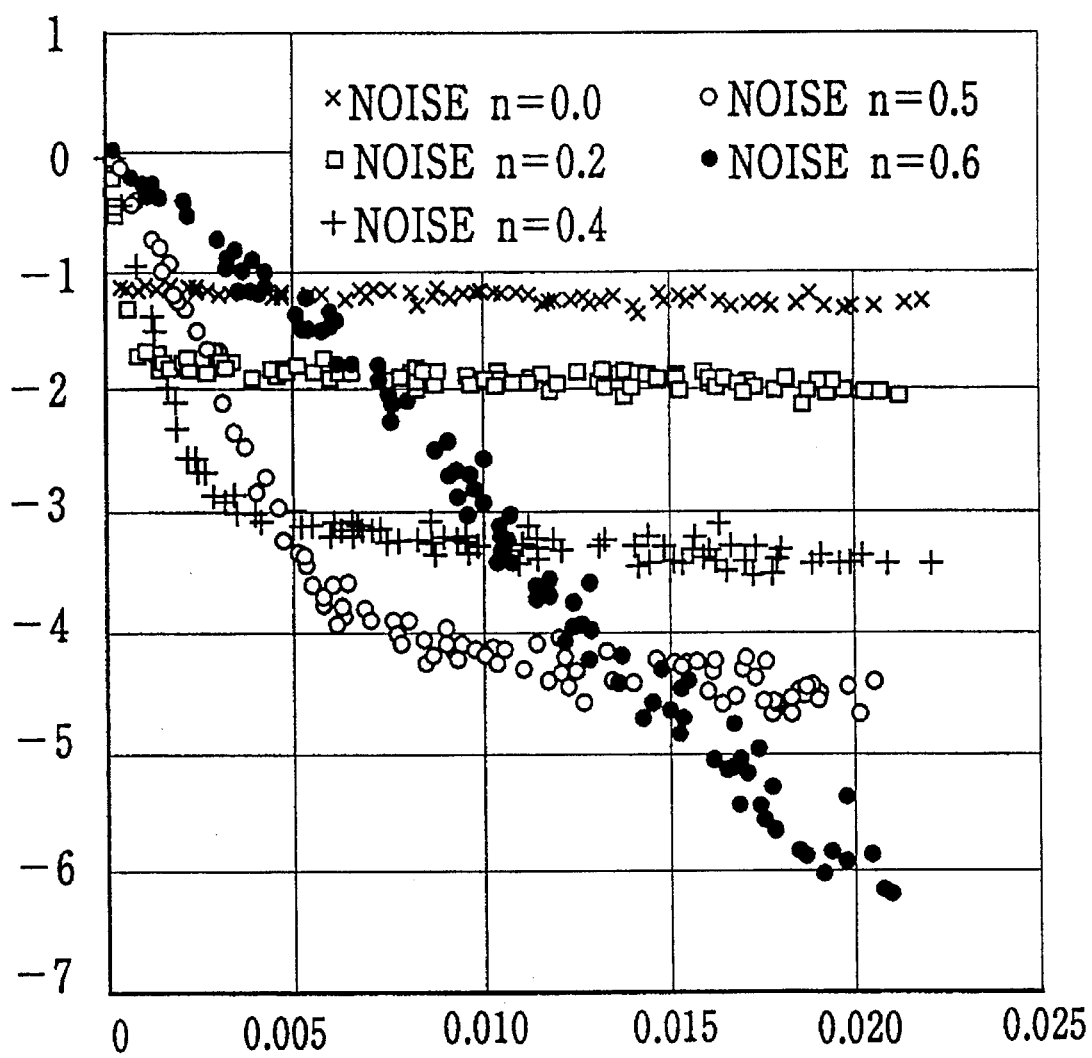
FIG. 14 is a graph showing a portion of the graph of FIG. 13 in enlargement.

Now, in order to assess the influence of the the difference in the frequency of presentations of the learning pattern at a time of the learning on the link formation, the relationship between the frequency of presentations of the learning patterns and the energy levels of the noiseless memorized patterns were checked, the result of which is indicated in FIG. 13, and the detail of FIG. 13 is enlarged in FIG. 14. Here, the number of learnings was set equal to 10000 and the link density was set equal to 0.2 as already mentioned above, but the following observation is equally valid for the other settings. It can be seen in FIG. 13 that the energy levels were lower for the more frequently presented patterns, and for the smaller noise. This is considered to be due to the fact that when the noise is larger, the link weight value is given as a sum of the various weight vectors containing noise which function to cancel each other to some extent such that the energy level is raised.

Also, it can be seen in FIG. 14 that, in the present invention case, the energy levels were almost constant regardless of the frequency of presentations for the noise less than or equal to 0.5, and the lowering of the energy level in accordance with the increase of the frequency of presentations that can be observed in the conventional case consistently was observed only for the noise n equal to 0.6. This result coincides with the earlier result shown in FIG. 12 that the recalling performances of the both cases are not much different for the noise n greater than or equal to 0.6.

Figure 15:
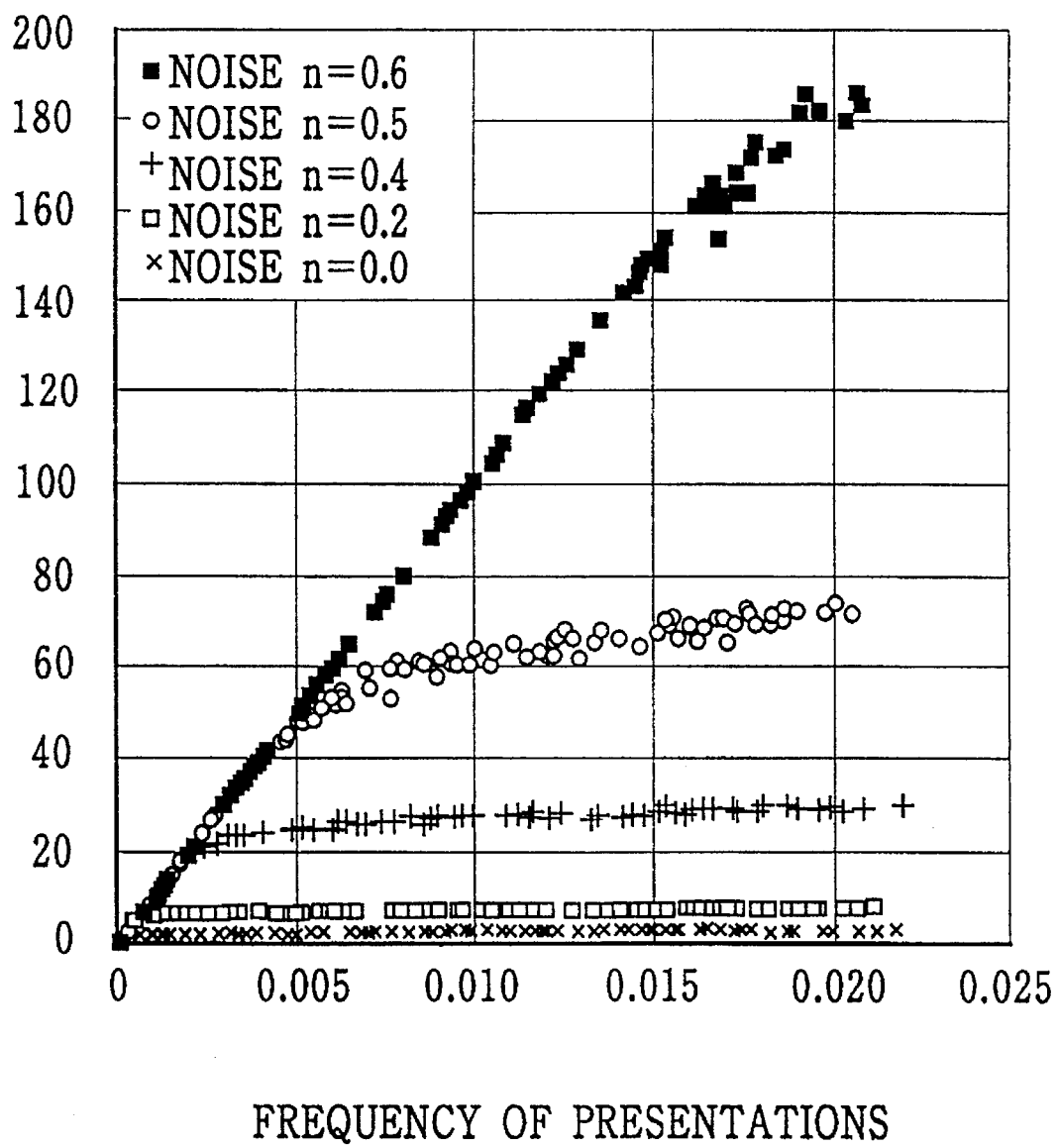
FIG. 15 is a graph of total learning amount versus frequency of presentations, showing the result of another test with the non-random frequencies of appearances.

It is to be noted here that the energy levels were higher for the larger noise in the conventional case, but this relationship was reversed for the present invention case. This is because, in the present invention case, the further learning is not made for those patterns which can be regarded as already sufficiently learned, so that the link weight values for these patterns are not updated and therefore the energy levels are not lowered. This fact can be verified by FIG. 15 which shows the relationship between the frequency of presentations and the learning amount, where the vertical axis represents the total learning amount, i.e., a cumulative total of the learning amount $\delta$ appearing in the equation (8) described above. It can be seen in FIG. 15 that the total learning amount remains constant regardless of the frequency of presentations for the noise n less than or equal to 0.5, but the total learning amount increases in accordance with the frequency of presentations for the noise n greater than or equal to 0.6, just as in the conventional case. This latter situation corresponds to a case of fixing the learning amount $\delta$ appearing in the equation (8) described above, in which case the present invention case can be reduced to the conventional case.

Figure 16:
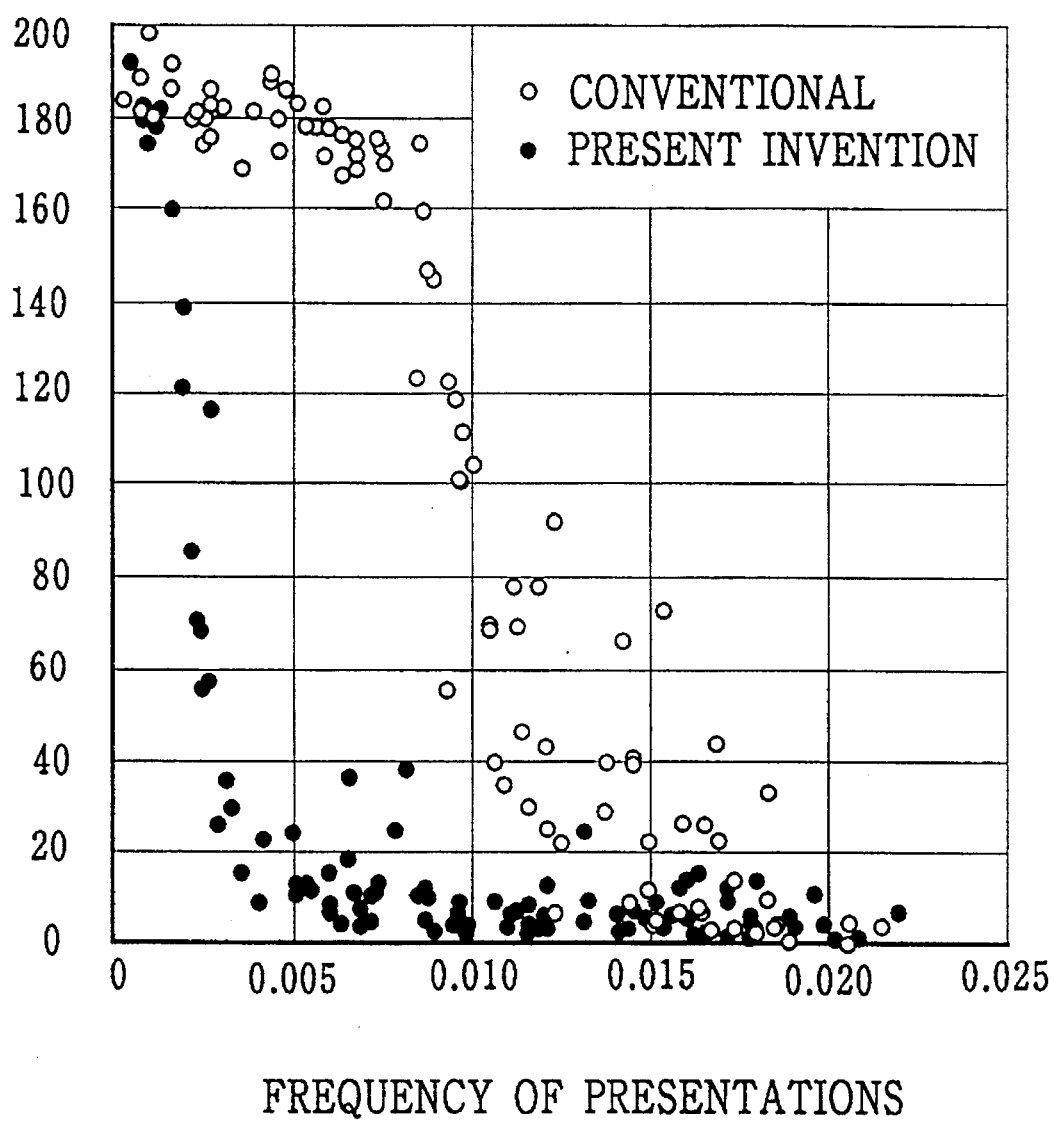
FIG. 16 is a graph of Hamming distance versus frequency of presentations, showing the result of another test with the non-random frequencies of appearances.

Next, FIG. 16 shows the relationship between the frequency of presentations of the learning pattern at a time of the learning and the level of the recalling performance in terms of the Hamming distance, for the noise n equal to 0.4. it can be seen in FIG. 16 that it was possible to achieve the adequate recalling in the conventional case only for the frequency of presentations greater than or equal to 0.013, whereas it was possible to achieve the adequate recalling in the present invention case even when the frequency of presentations was as low as 0.003. In other words, it was possible for the present invention case to achieve the adequate recalling even when the frequency of appearances was non-random.

In addition, the recalling performances resulting from two different settings of the number of learning equal to 2000 and 20000 for both cases were compared. In both cases, the recalling performances were improved as the number of learnings was increased, but the improvement was more drastic in the present invention case compared with the conventional case. In the present invention case, the recalling performance was improved along the progress of the learning even when the frequency of presentations was as low as 0.001, whereas in the conventional case, no improvement of the recalling performance due to the increase of the number of learnings was observed for the frequency of presentations less than or equal to 0.007.

Moreover, the recalling performances resulting from two different settings of the link density equal to 0.2 and 0.002 for both cases were compared. Here, the reduction of the link density is achieved in the conventional case by sequentially disconnecting the links for the less frequently appearing patterns, so that the recalling performance was sequentially lowered for those patterns which were less frequently presented in the learning. In contrast, in the present invention case, the disconnection of links is carried out uniformly, regardless of the frequency of presentations at a time of the learning, so that the recalling performance was lowered for all the patterns uniformly.

<<Tests with non-random correlations>>

Next, in order to verify the effectiveness of the method and the apparatus of the present invention described above, the tests were conducted for both the present invention case and the conventional case under a condition satisfying the sixth characteristic P6 of the patterns in the connectionist model which requires the existence of the non-random correlations for the patterns.

Here, just as in the tests with the non-random frequencies of appearances described above, the preliminary tests similar to those which yielded the results shown in FIG. 10 and FIG. 11 described above were carried out, and it was verified that the number of learnings parameter equal to 10000 and the link density parameter equal to 0.2 are adequate settings, so that these settings are used in the following tests. The noise n was varied within a range of 0 to 0.8.

Also, just as in the tests with the non-random frequencies of appearances described above, as the noiseless memorized patterns, M patterns (M=100) with N elements (nodes) each (N=1000) were randomly generated. Here, the characteristic P2 of the patterns in the connectionist model described above was also fulfilled by making each pattern to have only 100 nodes with the activation value equal to 1 among its 1000 nodes.

Here, however, 75 patterns from the 1st pattern to the 75-th pattern were randomly generated, while each of 25 patterns from the 76-th pattern to the 100-th patterns was generated to be a pattern for which the Hamming distance with respect to the (j−25)-th pattern ($76 \leq j \leq 100$) is 20. In other words, the 1st pattern to the 50-th pattern are independent patterns, but the 51st pattern to the 100-th pattern are 25 sets of correlated patterns.

Moreover, just as in the tests with the non-random frequencies of appearances described above, the noise was added to the learning patterns as well, and in addition, the frequency of presentations of the patterns was the same for both the learning and the recalling.

Figure 17:
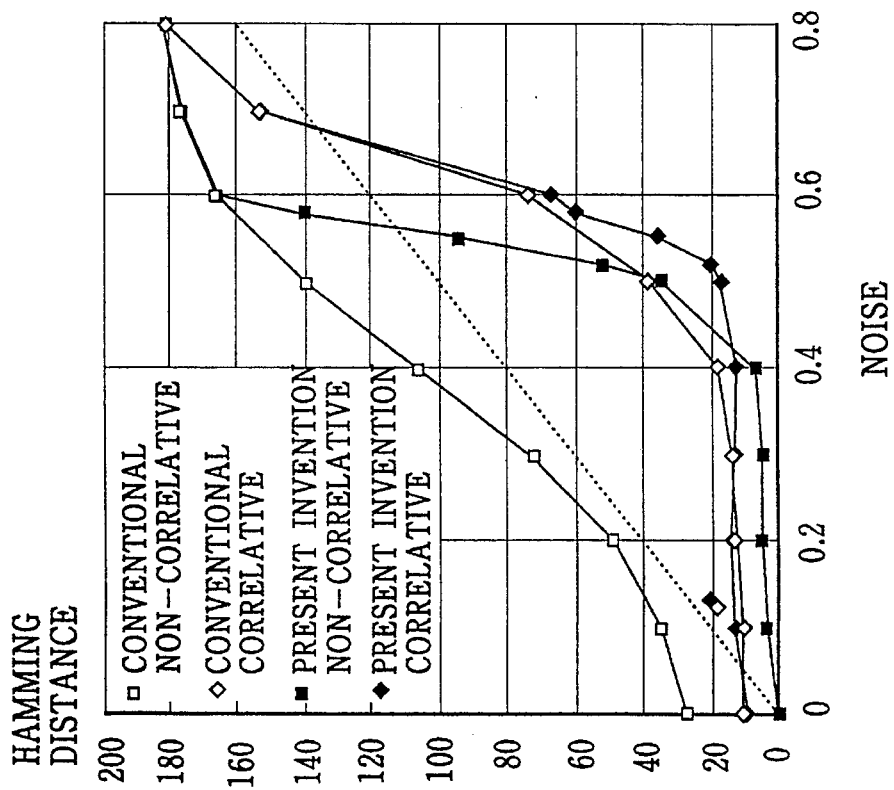
FIG. 17 is a graph of Hamming distance versus noise, showing the result of a test with the non-random correlations.

Next, the recalling performances of the present invention case and the conventional case obtained by varying the noise n from 0 to 0.8 are indicated in FIG. 17, for the correlative patterns and the non-correlative patterns separately.

It can be seen in FIG. 17 that the recalling performances for the correlative patterns were not much different in both cases. Here, the Hamming distance between the recalled pattern and the noise removed recalled pattern was about 10 even when there was no noise, because the intermediate patterns for which the Hamming distance with respect to the respective true patterns is 10 were memorized for the 51st to 100-th patterns which have the noiseless patterns at the Hamming distance 20 away.

On the other hand, it can be seen in FIG. 17 that the recalling performances for the non-correlative patterns were quite different in both cases. Namely, in the conventional case, the performance was worse in terms of the Hamming distances compared with the initial presentation pattern, regardless of the noise level. In contrast, it was possible to achieve the improved performance in the present invention case.

In particular, in the present invention case, the substantially equivalent recalling performance as that for the correlative patterns was achieved for the non-correlative patterns as well, for the noise n less than or equal to 0.5. In the present invention case, the Hamming distance becomes zero when the noise was zero, because there is no strongly correlated patterns nearby so that the interference does not occur.

The above observation can be explained from a point of view of the energy levels of the noiseless memorized patterns.

Figure 18:
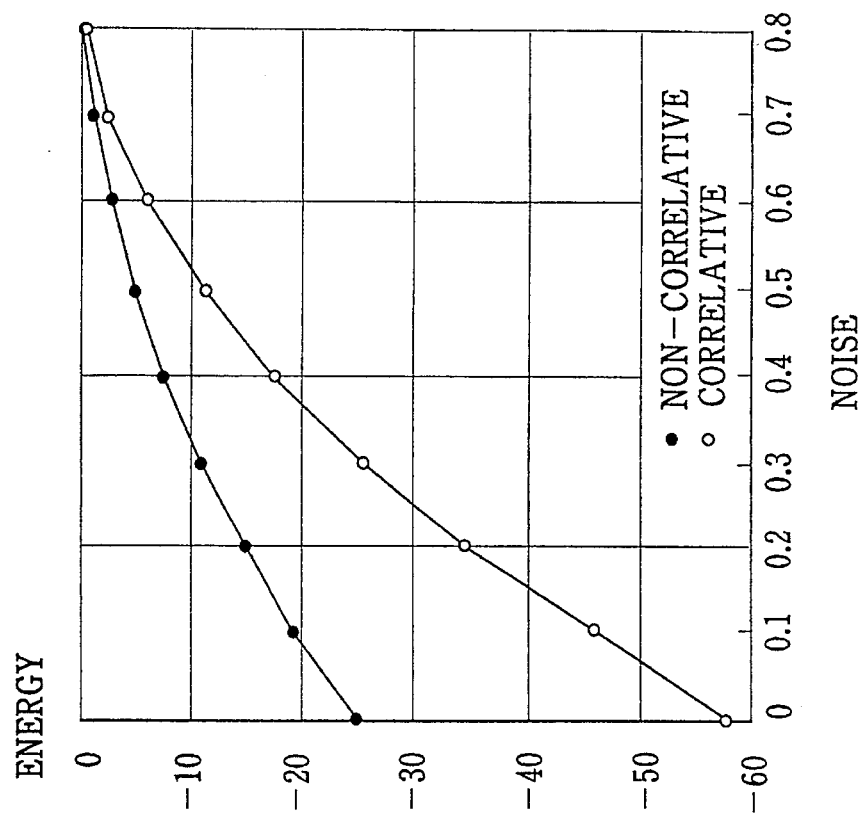
FIG. 18 is a graph of energy versus noise for a conventional case, for explaining the result of the test shown in FIG. 17.

To this end, FIG. 18 shows the relationship between the average energy level of the patterns and the noise in the conventional case, for the correlative patterns and the non-correlative patterns separately. As can be seen in FIG. 18, the average energy level of the non-correlative patterns is approximately one half of the average energy level of the correlative patterns at each noise level in the conventional case. This fact implies that the energy level of the non-correlative patterns can be easily concealed by the noise, so that the non-correlative patterns are harder to recall in the conventional case.

Figure 19:
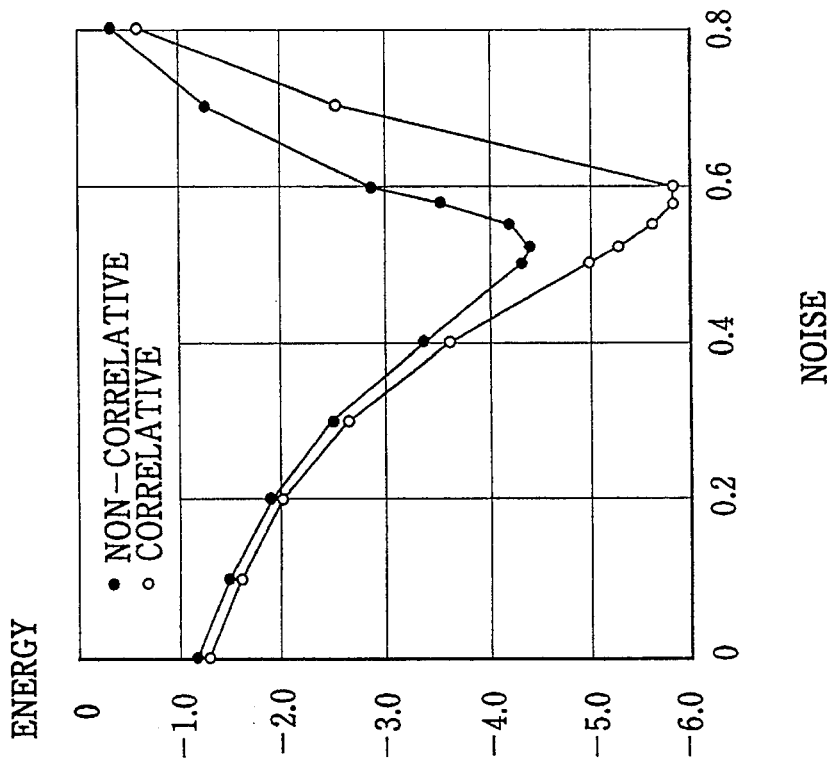
FIG. 19 is a graph of energy versus noise for a present invention case, for explaining the result of the test shown in FIG. 17.

In contrast, FIG. 19 shows the similar relationship between the average energy level of the patterns and the noise in the present invention case, for the correlative patterns and the non-correlative patterns separately. As can be seen in FIG. 19, the average energy level is approximately the same for both the correlative patterns and the non-correlative patterns for the noise less than or equal to 0.5 in the present invention case, so that both the correlative patterns and the non-correlative patterns can be recalled at the equal ease. The increase of the average energy level for the noise over 0.5 for both the correlative patterns and the non-correlative patterns implies that the memorization of the patterns becomes difficult very rapidly for the higher noise level in the present invention case.

It can also be seen in FIG. 19 that the average energy values for the correlative patterns and the non-correlative patterns are both very high for the noise n equal to 0.8, and this fact implies that the minimum energy level is not achievable in a vicinity of the noiseless patterns.

<<Test on the speed up of the learning>>

Next, in order to verify the effectiveness of the method and the apparatus of the present invention described above, the test regarding a time required for the learning was also conducted for both the present invention case and the conventional case.

In the learning in the present invention case, the energy level of the presented pattern is obtained and the link weight value is updated unless the obtained energy level is zero. In the following, the speed of the learning is considered in terms of the number of floating point multiplications which are known to have the highest computational cost.

For example, for each link, the updating of the energy level requires two multiplications, while the updating of the link weight values requires three multiplications. Consequently, the learning in the present invention case requires five multiplications per link in a case of updating the link weight value and two multiplication per link in a case of not updating the link weight value, whereas the learning in the conventional case always requires three multiplications per link. In the present invention case, the case of not updating the link weight value occurs when $\delta=0$, and when the function g of the equation (13) described above is used, the learning is not made when the energy level E of the learning pattern is closer to the reference energy level Eth than a predetermined level, i.e., when |E−Eth| is less than or equal to the predetermined level.

Figure 20:
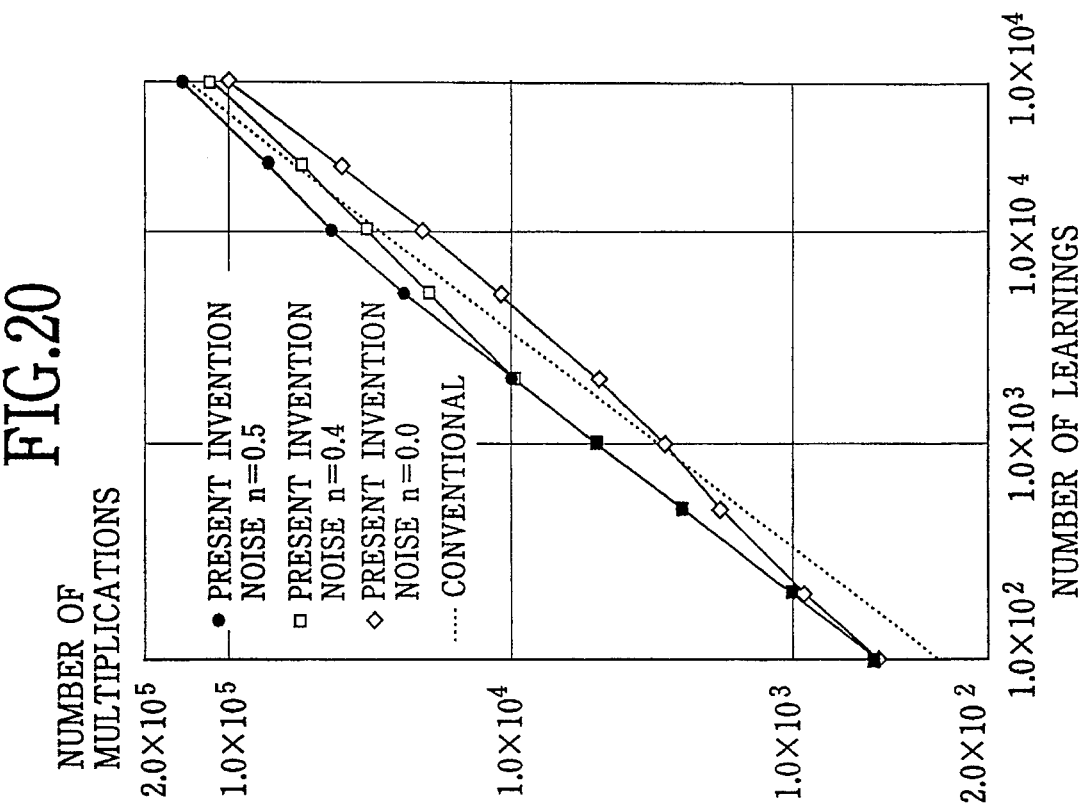
FIG. 20 is a graph of number of multiplications versus number of learnings, showing the result of a test regarding the speed up of the learning.

The relationship between the number of multiplications and the number of learnings in the present invention case for three different noise levels of 0.0, 0.4, and 0.5 and in the conventional case which were obtained by this test are shown in FIG. 20. It can be seen in FIG. 20 that the number of multiplications required in the learning in the present invention case becomes smaller than that required in the learning in the conventional case, for the sufficiently larger number of learnings and the sufficiently smaller noise.

Thus, the speed of the learning in the present invention case can be made faster than that in the conventional case, for sufficiently large number of learnings and the sufficiently small noise.

As described above, according to the present invention, it becomes possible to provide a scheme for learning of an associative memory, capable of accounting all of the characteristics P1 to P6 of the patterns in the connectionist model simultaneously, i.e., a scheme for learning of an associative memory suitable for the connectionist model which can deal with the patterns having the non-random frequencies of the appearances or the non-random correlations.

It is to be noted here that many modifications and variations of the above embodiments may be made without departing from the novel and advantageous features of the present invention. Accordingly, all such modifications and variations are intended to be included within the scope of the appended claims.

What is claimed is:

1. An apparatus, comprising:

an associative memory in a form of a neural network, including:

a plurality of nodes having activation values; and a plurality of links, connected with the nodes, having link weight values;

pattern entering means for sequentially entering a plurality of learning patterns into the neural network, each learning pattern having a plurality of elements in correspondence with the nodes;

energy calculation means for calculating an energy E of said each learning pattern entered by the pattern entering means;

learning amount determination means for determining a learning amount $\delta$ for said each learning pattern entered by the pattern entering means, according to a difference between the energy E calculated by the energy calculation means and a predetermined reference energy level Eth, using the following equation:

$$\delta = g(E - Eth)$$

where g is an upper and lower bounded monotonically increasing function with $g(0)=0$; and link weight value updating means for updating the link weight values of the links according to said each learning pattern entered by the pattern entering means and the learning amount $\delta$ determined by the learning amount determination means.

2. The apparatus of claim 1, wherein the energy calculation means calculates the energy E of said each learning pattern according to values of the elements of said each learning pattern, the link weight values previously updated by the link weight value updating means, and activation probabilities for the values of the elements in said each learning pattern to take activated values.

3. The apparatus of claim 2, wherein the energy calculation means calculates the energy E of said each learning pattern according to the following equation:

$$E = k \left\{ \sum_j \sum_i W_{ji}(V_j - a_j)(V_i - a_i) - b \sum_j I_j (V_j - a_j) \right\}$$

where k is a non-zero constant coefficient having a sign identical to that of the predetermined reference energy level Eth, $W_{ji}$ is a link weight value for a link between a j-th node and an i-th node, $V_j$ is a value of a j-th element in said each learning pattern, $V_i$ is a value of an i-th element in said each learning pattern, $a_j$ is an activation probability for the value $V_j$ of the j-th element in said each learning pattern to take an activated value, $a_i$ is an activation probability for the value $V_i$ of the i-th element in said each learning pattern to take an activated value, $I_j$ is a predetermined threshold for the j-th node, b is a constant coefficient, and j and i are integers.

4. The apparatus of claim 3, wherein the constant coefficient b is equal to 2.

5. The apparatus of claim 1, wherein the link weight value updating means updates the link weight values according to values of the elements of said each learning pattern, the learning amount $\delta$ determined by the learning amount determination means, and activation probabilities for the values of the elements in said each learning pattern to take activated values.

6. The apparatus of claim 5, wherein the link weight value updating means updates a link weight value $W_{ji}$ for a link between a j-th node and an i-th node according to the following formula:

$$E = k \left\{ \sum_j \sum_i W_{ji}(V_j - a_j)(V_i - a_i) - b \sum_j I_j (V_j - a_j) \right\}$$

where $W_{ji}$ (new) is a link weight value after updating, $W_{ji}$ (old) is a link weight value before updating, $V_j$ is a value of a j-th element in said each learning pattern, $V_i$ is a value of an i-th element in said each learning pattern, $a_j$ is an activation probability for the value $V_j$ of the j-th element in said each learning pattern to take an activated value, $a_i$ is an activation probability for the value $V_i$ of the i-th element in said each learning pattern to take an activated value, and j and i are integers.

7. The apparatus of claim 1, further comprising activation probability updating means for updating activation probabilities for values of the elements in said each learning pattern to take activated values according to the values of the elements in said each learning pattern entered by the pattern entering means and the learning amount $\delta$ determined by the learning amount determination means.

8. The apparatus of claim 7, wherein the activation probability updating means updates an activation probability $a_j$ for a value of a j-th element in said each learning pattern to take an activated value according to the following formula:

$$a_j(\text{new}) \leftarrow (1-\delta)a_j(\text{old}) + \delta V_j$$

where $a_j$ (new) is an activation probability after updating, $a_j$ (old) is an activation probability before updating, $V_j$ is the value of the j-th element in said each learning pattern, and j is an integer.

9. A method of operating an associative memory in a form of a neural network in which a plurality of nodes having activation values are connected by a plurality of links having link weight values, comprising the steps of:

(a) entering a plurality of learning patterns into the neural network sequentially, each learning pattern having a plurality of elements in correspondence with the nodes;

(b) calculating an energy E of said each learning pattern entered at the step (a);

(c) determining a learning amount $\delta$ for said each learning pattern according to a difference between the energy E calculated at the step (b) and a predetermined reference energy level Eth, using the following equation:

$$\delta = g(E - Eth)$$

where g is an upper and lower bounded monotonically increasing function with $g(0)=0$;

(d) updating the link weight values of the links in the neural network according to said each learning pattern entered at the step (a) and the learning amount δ determined at the step (c), so as to achieve a learning of the associative memory;

(e) presenting an input pattern having a plurality of elements in correspondence with the nodes to the neural network;

(f) updating the activation values of the nodes in the neural network according to the input pattern presented at the step (e) and the link weight values of the links in the neural network updated at the step (d); and (g) operating the associative memory for recalling an appropriate pattern according to the activation values of the nodes in the neural network updated at the step (f), so as to achieve an association by the associative memory.

10. The method of claim 9, wherein the energy E of said each learning pattern is calculated at the step (b) according to values of the elements of said each learning pattern, the link weight values previously updated at the step (d), and activation probabilities for the values of the elements in said each learning pattern to take activated values.

11. The method of claim 10, wherein the energy E of said each learning pattern is calculated at the step (b) according to the following equation:

$$W_{ji}(\text{new}) \leftarrow \begin{cases} (1-\delta)W_{ji}(\text{old}) + \delta(V_j - a_j)(V_i - a_i) & \text{if } j \neq i \\ 0 & \text{if } j = i \end{cases}$$

where k is a non-zero constant coefficient having a sign identical to that of the predetermined reference energy level Eth $W_{ji}$ is a link weight value for a link between a j-th node and an i-th node, $V_j$ is a value of a j-th element in said each learning pattern, $V_i$ is a value of an i-th element in said each learning pattern, $a_j$ is an activation probability for the value $V_j$ of the j-th element in said each learning pattern to take an activated value, $a_i$ is an activation probability for the value $V_i$ of the i-th element in said each learning pattern to take an activated value, $I_j$ is a predetermined threshold for the j-th node, b is a constant coefficient, and j and i are integers.

12. The method of claim 11, wherein the constant coefficient b is equal to 2.

13. The method of claim 9, wherein the link weight values are updated at the step (d) according to values of the elements of said each learning pattern, the learning amount δ determined at the step (c), and activation probabilities for the values of the elements in said each learning pattern to take activated values.

14. The method of claim 13, wherein the link weight value $W_{ji}$ for a link between a j-th node and an i-th node is updated at the step (d) according to the following formula:

$$W_{ji}(\text{new}) \leftarrow \begin{cases} (1-\delta)W_{ji}(\text{old}) + \delta(V_j - a_j)(V_i - a_i) & \text{if } j \neq i \\ 0 & \text{if } j = i \end{cases}$$

where $W_{ji}$ (new) is a link weight value after updating, $W_{ji}$ (old) is a link weight value before updating, $V_j$ is a value of a i-th element in said each learning pattern, $a_j$ is an activation probability for the value $V_j$ of the j-th element in said each learning pattern to take an activated value, $a_i$ is an activation probability for the value $V_i$ of the i-th element in said each learning pattern to take an activated value, and j and i are integers.

15. The method of claim 9, further comprising the step of:

(h) updating activation probabilities for values of the elements in said each learning pattern to take activated values according to the values of the elements in said each learning pattern entered at the step (a) and the learning amount δ determined at the step (c).

16. The method of claim 15, wherein an activation probability $a_j$ for a value of a j-th element in said each learning pattern to take an activated value is updated at the step (h) according to the following formula:

$$a_j(\text{new}) \leftarrow (1-\delta)a_j(\text{old}) + \delta V_j$$

where $a_j$ (new) is an activation probability after updating, $a_j$ (old) is an activation probability before updating, $V_j$ is the value of the j-th element in said each learning pattern, and j is an integer.

17. The method of claim 9, wherein the activation values of the nodes are updated at the step (f) according to values of the elements of the input pattern presented at the step (e), the link weight values updated at the step (d), and activation probabilities for the values of the elements in the input pattern to take activated values.

18. The method of claim 17, wherein the activation values of the nodes are updated at the step (f) according to the following formula:

$$V_j' \leftarrow f\left( \sum_i W_{ji}(V_i' - a_i) - I_j \right)$$

where $V_j'$ is an activation value of a j-th node, $W_{ji}$ is a link weight value for a link between the j-th node and an i-th node, $V_i'$ is a value of an i-th element in the input pattern, $a_i$ is an activation probability for the value $V_i'$ of the i-th element in the input pattern to take an activated value, $I_j$ is a predetermined threshold for the j-th node, f is a threshold function defined by the following equation:

$$f(u) = \begin{cases} 1 & \text{if } u \geq 0 \\ 0 & \text{if } u < 0 \end{cases}$$

where $$u = \sum_i W_{ji}(V_i' - a_i) - I_j,$$

and j and i are integers.

* * * * *